United States Patent
Rivas Barragan et al.

(10) Patent No.: US 11,444,866 B2
(45) Date of Patent: Sep. 13, 2022

(54) METHODS AND APPARATUS FOR COMPOSITE NODE CREATION AND MANAGEMENT THROUGH SDI PARTITIONS

(71) Applicant: INTEL CORPORATION, Santa Clara, CA (US)

(72) Inventors: Daniel Rivas Barragan, Cologne (DE); Francesc Guim Bernat, Barcelona (ES); Susanne M. Balle, Hudson, NH (US); John Chun Kwok Leung, Folsom, CA (US); Suraj Prabhakaran, Aachen (DE); Murugasamy K. Nachimuthu, Beaverton, OR (US); Slawomir Putyrski, Gdynia (PL)

(73) Assignee: INTEL CORPORATION, Santa Clara, CA (US)

( * ) Notice: Subject to any disclaimer, the term of this patent is extended or adjusted under 35 U.S.C. 154(b) by 1115 days.

(21) Appl. No.: 15/655,864

(22) Filed: Jul. 20, 2017

(65) Prior Publication Data
US 2018/0026849 A1    Jan. 25, 2018

Related U.S. Application Data

(60) Provisional application No. 62/427,268, filed on Nov. 29, 2016, provisional application No. 62/423,727, (Continued)

(51) Int. Cl.
*G06F 15/173* (2006.01)
*H04L 43/16* (2022.01)
(Continued)

(52) U.S. Cl.
CPC .......... *H04L 43/16* (2013.01); *G06F 16/2282* (2019.01); *G06F 16/2379* (2019.01);
(Continued)

(58) Field of Classification Search
None
See application file for complete search history.

(56) References Cited

U.S. PATENT DOCUMENTS

2006/0179143 A1* 8/2006 Walker .................... G06F 15/16
                                                        709/226
2007/0106857 A1* 5/2007 Koning ................... G06F 16/10
                                                        711/162

(Continued)

*Primary Examiner* — Anh Nguyen
(74) *Attorney, Agent, or Firm* — KDB Firm PLLC

(57) ABSTRACT

Techniques for managing static and dynamic partitions in software-defined infrastructures (SDI) are described. An SDI manager component may include one or more processor circuits to access one or more resources. The SDI manager component may include a partition manager to create one or more partitions using the one or more resources, the one or more partitions each including a plurality of nodes of a similar resource type. The SDI manager may generate an update to a pre-composed partition table, stored within a non-transitory computer-readable storage medium, including the created one or more partitions, and receive a request from an orchestrator for a node. The SDI manager may select one of the created one or more partitions to the orchestrator based upon the pre-composed partition table, and identify the selected partition to the orchestrator. Other embodiments are described and claimed.

25 Claims, 18 Drawing Sheets

Related U.S. Application Data filed on Nov. 17, 2016, provisional application No. 62/376,859, filed on Aug. 18, 2016, provisional application No. 62/365,969, filed on Jul. 22, 2016.

(51) Int. Cl.

| | |
|---|---|
| *G06F 16/22* | (2019.01) |
| *G06F 16/23* | (2019.01) |
| *H04L 41/0896* | (2022.01) |
| *H04L 43/0876* | (2022.01) |
| *H04L 47/80* | (2022.01) |
| *H04Q 9/00* | (2006.01) |
| *H04L 41/12* | (2022.01) |
| *H04L 67/10* | (2022.01) |
| *H04L 41/5025* | (2022.01) |
| *H04L 67/1031* | (2022.01) |
| *H04L 41/0816* | (2022.01) |
| *H04L 67/00* | (2022.01) |
| *H04L 43/0852* | (2022.01) |
| *H04L 43/0894* | (2022.01) |
| *H04L 41/5009* | (2022.01) |
| *H04L 41/5054* | (2022.01) |
| *H04L 41/16* | (2022.01) |
| *H04L 47/722* | (2022.01) |

(52) U.S. Cl.
 CPC ...... *H04L 41/0816* (2013.01); *H04L 41/0896* (2013.01); *H04L 41/12* (2013.01); *H04L 41/5025* (2013.01); *H04L 43/0876* (2013.01); *H04L 47/803* (2013.01); *H04L 67/10* (2013.01); *H04L 67/1031* (2013.01); *H04L 67/34* (2013.01); *H04Q 9/00* (2013.01); *H04L 41/16* (2013.01); *H04L 41/5009* (2013.01); *H04L 41/5054* (2013.01); *H04L 43/0858* (2013.01); *H04L 43/0894* (2013.01); *H04L 47/722* (2013.01); *H04L 47/805* (2013.01); *H04Q 2209/20* (2013.01)

(56) References Cited

U.S. PATENT DOCUMENTS

| | | | |
|---|---|---|---|
| 2015/0207758 A1* | 7/2015 | Mordani | H04L 47/78 709/226 |
| 2015/0263890 A1* | 9/2015 | Fall | H04L 47/70 709/226 |
| 2017/0212939 A1* | 7/2017 | Mukherjee | G06F 16/2477 |
| 2018/0249301 A1* | 8/2018 | Jeong | H04W 4/00 |

* cited by examiner

800

*1700*

```
Receive instruction to create static or dynamic
partition.
1702
        │
        ▼
Create static or dynamic partition.
1704
        │
        ▼
Update pre-composite node table.
1706
        │
        ▼
Inform orchestrator of new partition.
1708
```

*FIG. 17*

METHODS AND APPARATUS FOR COMPOSITE NODE CREATION AND MANAGEMENT THROUGH SDI PARTITIONS

RELATED APPLICATIONS

This application claims priority to U.S. Provisional Patent Application No. 62/427,268, filed Nov. 29, 2016; U.S. Provisional Patent Application No. 62/423,727, filed Nov. 17, 2016; U.S. Provisional Patent Application No. 62/376,859, filed Aug. 18, 2016; and U.S. Provisional Patent Application No. 62/365,969, filed Jul. 22, 2016; each of which is hereby incorporated by reference in its entirety.

BACKGROUND

Applications executed in a data center may use a set of resources in order to achieve a certain goal (e.g., process database queries performed by users). Applications may be sensitive to a subset of resources from all the resources available within a particular data center. For example a database within the data center may use processors, memory, disk, and fabric, but may be most sensitive to processor and memory availability and performance. Data center throughput may be increased by adding resources, such as memory and compute bandwidth and power. However, increasing other resources, such as fabric or disk may not provide a direct benefit to throughput. Furthermore, reduction of memory or compute bandwidth may have negative impact on throughput. Data center architectures have addressed the problem of mapping the correct amount of resources to the applications using applications requirements, which may be provided by the user or directly by the application, in order to do the proper resource selection and allocation. This process may include selecting the set of resources and also ensuring that certainty quantities and qualities such as the needed Quality of Service (QoS) are reserved to satisfy the requirements. However, in many data center architectures, such as those using software defined infrastructure, there are remaining challenges with respect to the correct allocation and management of resources. Accordingly, improved techniques for the management of resources within data center architectures are desirable.

BRIEF DESCRIPTION OF THE DRAWINGS

FIG. 17 illustrates a logic flow according to an embodiment.

DETAILED DESCRIPTION

Figure 1:
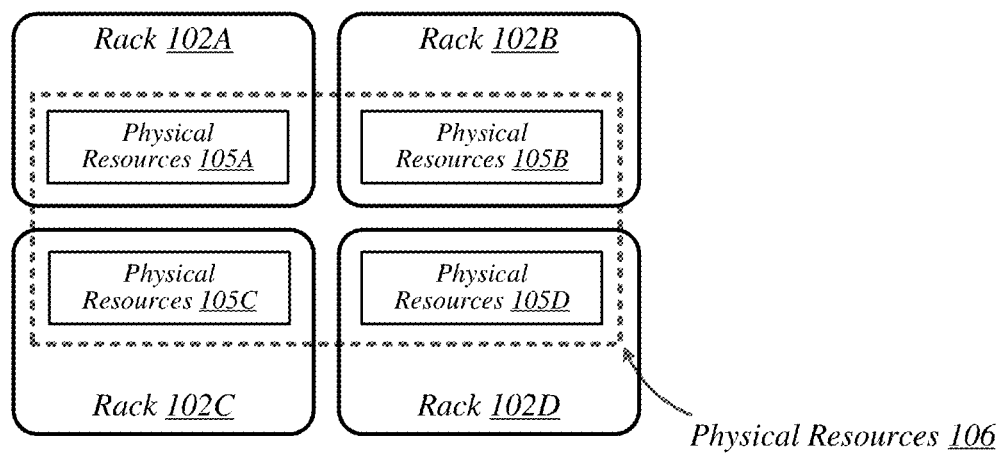
FIG. 1 illustrates an example of a data center.

Various embodiments are generally directed to techniques for management of software defined infrastructure (SDI) systems. In particular, some embodiments are directed to the use of static or dynamic partitions, which may be user-defined or determined based upon machine learning techniques to satisfy the needs of applications known to run on a data center.

With general reference to notations and nomenclature used herein, portions of the detailed description that follow may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may incorporate a general computing device. The required structure for a variety of these machines will appear from the description given. The devices described herein may be any of a variety of types of computing devices, including without limitation, a server, a workstation, a data center or the like.

In various embodiments, the aforementioned processors may include any of a wide variety of commercially available processors, including without limitation, an Intel® Celeron®, Core (2) Duo®, Core (2) Quad®, Core i3®, Core i5®, Core i7®, Atom®, Itanium®, Pentium®, Xeon® or XScale® processor. Further, one or more of these processor elements may include a multi-core processor (whether the multiple cores coexist on the same or separate dies), and/or a multi-processor architecture of some other variety by which multiple physically separate processors are in some way linked.

In various embodiments, the aforementioned storages may be based on any of a wide variety of information storage technologies, possibly including volatile technologies requiring the uninterrupted provision of electric power, and possibly including technologies entailing the use of machine-readable storage media that may or may not be removable. Thus, each of these storages may include any of a wide variety of types (or combination of types) of storage devices, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, networks may be a single network possibly limited to extending within a single building or other relatively limited area, a combination of connected networks possibly extending a considerable distance, and/or may include the Internet. Thus, networks may be based on any of a variety (or combination) of communications technologies by which signals may be exchanged, including without limitation, wired technologies employing electrically and/or optically conductive cabling, and wireless technologies employing infrared, radio frequency or other forms of wireless transmission. Accordingly, the aforementioned interfaces may include circuitry providing at least some of the requisite functionality to enable such coupling. However, the aforementioned interfaces may also be at least partially implemented with sequences of instructions executed by the processor elements (e.g., to implement a protocol stack or other features). Where one or more portions of the networks may employs electrically and/or optically conductive cabling, the interface may employ signaling and/or protocols conforming to any of a variety of industry standards, including without limitation, RS-232C, RS-422, USB, Ethernet (IEEE-802.3) or IEEE-1394. Alternatively or additionally, where one or more portions of the networks entail the use of wireless signal transmission, corresponding ones of these interfaces may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1×RTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc. It should be noted that although the interface is depicted as a single block, it might include multiple interfaces that may be based on differing signaling technologies. This may be the case especially where one or more of these interfaces couples the components to more than one network, each employing differing communications technologies.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, known structures and devices are shown in block diagram form in order to facilitate a description thereof. The intention is to provide a thorough description such that all modifications, equivalents, and alternatives within the scope of the claims are sufficiently described.

Additionally, reference may be made to variables, such as, "a", "b", "c", which are used to denote components where more than one component may be implemented. It is important to note, that there need not necessarily be multiple components and further, where multiple components are implemented, they need not be identical. Instead, use of variables to reference components in the figures is done for convenience and clarity of presentation. Furthermore, as used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrase "at least one of A, B or C" can mean A; B; C; A and B; A and C; B and C; or A, B and C.

FIG. 1 illustrates a conceptual overview of a data center 100 that may generally be representative of a data center or other type of computing network in/for which one or more techniques described herein may be implemented according to various embodiments. As shown in FIG. 1, data center 100 may generally contain a plurality of racks, each of which may house computing equipment comprising a respective set of physical resources. In the particular non-limiting example depicted in FIG. 1, data center 100 contains four racks 102A to 102D, which house computing equipment comprising respective sets of physical resources (PCRs) 105A to 105D. According to this example, a collective set of physical resources 106 of data center 100 includes the various sets of physical resources 105A to 105D that are distributed among racks 102A to 102D. Physical resources 106 may include resources of multiple types, such as—for example—processors, co-processors, accelerators, field-programmable gate arrays (FPGAs), memory, and storage. The embodiments are not limited to these examples.

The illustrative data center 100 differs from typical data centers in many ways. For example, in the illustrative embodiment, the circuit boards ("sleds") on which components such as CPUs, memory, and other components are placed are designed for increased thermal performance. In particular, in the illustrative embodiment, the sleds are shallower than typical boards. In other words, the sleds are shorter from the front to the back, where cooling fans are located. This decreases the length of the path that air must to travel across the components on the board. Further, the components on the sled are spaced further apart than in typical circuit boards, and the components are arranged to reduce or eliminate shadowing (i.e., one component in the air flow path of another component). In the illustrative embodiment, processing components such as the processors are located on a top side of a sled while near memory, such as DIMMs, are located on a bottom side of the sled. As a result of the enhanced airflow provided by this design, the components may operate at higher frequencies and power levels than in typical systems, thereby increasing performance. Furthermore, the sleds are configured to blindly mate with power and data communication cables in each rack 102A, 102B, 102C, 102D, enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

Furthermore, in the illustrative embodiment, the data center 100 utilizes a single network architecture ("fabric") that supports multiple other network architectures including Ethernet and Omni-Path. The sleds, in the illustrative embodiment, are coupled to switches via optical fibers, which provide higher bandwidth and lower latency than typical twister pair cabling (e.g., Category 5, Category 5e, Category 6, etc.). Due to the high bandwidth, low latency interconnections and network architecture, the data center 100 may, in use, pool resources, such as memory, accelerators (e.g., graphics accelerators, FPGAs, ASICs, etc.), and data storage drives that are physically disaggregated, and provide them to compute resources (e.g., processors) on an as needed basis, enabling the compute resources to access the pooled resources as if they were local. The illustrative data center 100 additionally receives usage information for the various resources, predicts resource usage for different types of workloads based on past resource usage, and dynamically reallocates the resources based on this information.

Figure 2:
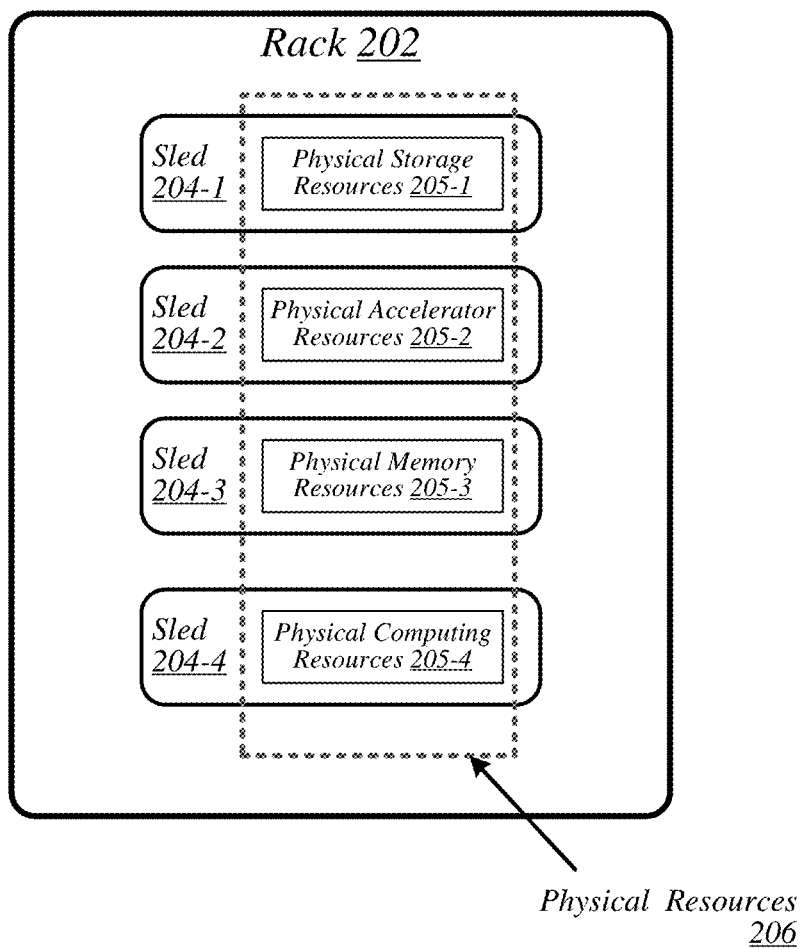
FIG. 2 illustrates an example of a rack.

The racks 102A, 102B, 102C, 102D of the data center 100 may include physical design features that facilitate the automation of a variety of types of maintenance tasks. For example, data center 100 may be implemented using racks that are designed to be robotically-accessed, and to accept and house robotically-manipulable resource sleds. Furthermore, in the illustrative embodiment, the racks 102A, 102B, 102C, 102D include integrated power sources that receive higher current than typical for power sources. The increased current enables the power sources to provide additional power to the components on each sled, enabling the components to operate at higher than typical frequencies. FIG. 2 illustrates an exemplary logical configuration of a rack 202 of the data center 100. As shown in FIG. 2, rack 202 may generally house a plurality of sleds, each of which may comprise a respective set of physical resources. In the particular non-limiting example depicted in FIG. 2, rack 202 houses sleds 204-1 to 204-4 comprising respective sets of physical resources 205-1 to 205-4, each of which constitutes a portion of the collective set of physical resources 206 comprised in rack 202. With respect to FIG. 1, if rack 202 is representative of—for example—rack 102A, then physical resources 206 may correspond to the physical resources 105A comprised in rack 102A. In the context of this example, physical resources 105A may thus be made up of the respective sets of physical resources, including physical storage resources 205-1, physical accelerator resources 205-2, physical memory resources 204-3, and physical compute resources 205-5 comprised in the sleds 204-1 to 204-4 of rack 202. The embodiments are not limited to this example. Each sled may contain a pool of each of the various types of physical resources (e.g., compute, memory, accelerator, storage). By having robotically accessible and robotically manipulable sleds comprising disaggregated resources, each type of resource can be upgraded independently of each other and at their own optimized refresh rate.

Figure 3:
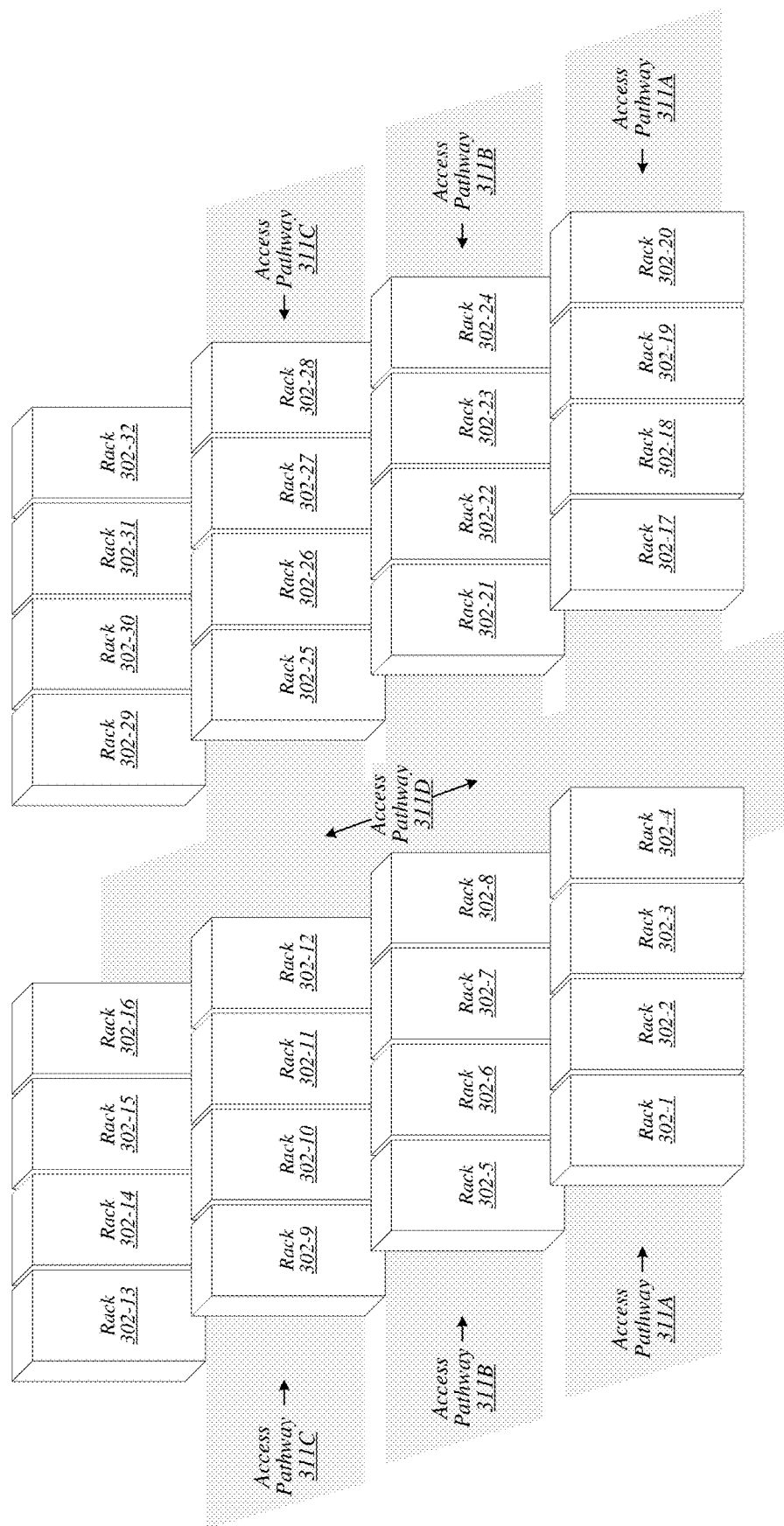
FIG. 3 illustrates an example of a data center.

FIG. 3 illustrates an example of a data center 300 that may generally be representative of one in/for which one or more techniques described herein may be implemented according to various embodiments. In the particular non-limiting example depicted in FIG. 3, data center 300 comprises racks 302-1 to 302-32. In various embodiments, the racks of data center 300 may be arranged in such fashion as to define and/or accommodate various access pathways. For example, as shown in FIG. 3, the racks of data center 300 may be arranged in such fashion as to define and/or accommodate access pathways 311A, 311B, 311C, and 311D. In some embodiments, the presence of such access pathways may generally enable automated maintenance equipment, such as robotic maintenance equipment, to physically access the computing equipment housed in the various racks of data center 300 and perform automated maintenance tasks (e.g., replace a failed sled, upgrade a sled). In various embodiments, the dimensions of access pathways 311A, 311B, 311C, and 311D, the dimensions of racks 302-1 to 302-32, and/or one or more other aspects of the physical layout of data center 300 may be selected to facilitate such automated operations. The embodiments are not limited in this context.

Figure 4:
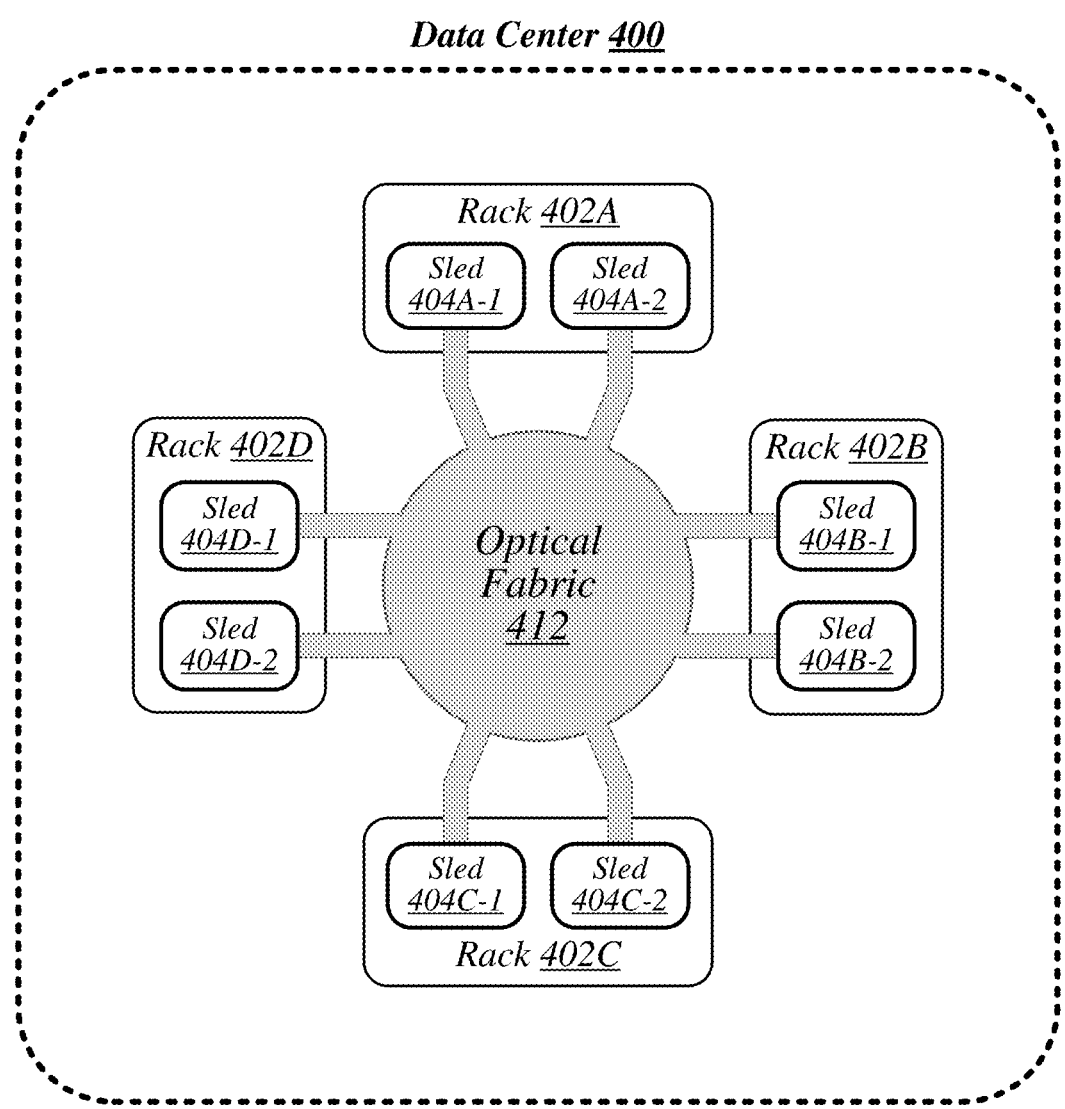
FIG. 4 illustrates an example of a data center.

FIG. 4 illustrates an example of a data center 400 that may generally be representative of one in/for which one or more techniques described herein may be implemented according to various embodiments. As shown in FIG. 4, data center 400 may feature an optical fabric 412. Optical fabric 412 may generally comprise a combination of optical signaling media (such as optical cabling) and optical switching infrastructure via which any particular sled in data center 400 can send signals to (and receive signals from) each of the other sleds in data center 400. The signaling connectivity that optical fabric 412 provides to any given sled may include connectivity both to other sleds in a same rack and sleds in other racks. In the particular non-limiting example depicted in FIG. 4, data center 400 includes four racks 402A to 402D. Racks 402A to 402D house respective pairs of sleds 404A-1 and 404A-2, 404B-1 and 404B-2, 404C-1 and 404C-2, and 404D-1 and 404D-2. Thus, in this example, data center 400 comprises a total of eight sleds. Via optical fabric 412, each such sled may possess signaling connectivity with each of the seven other sleds in data center 400. For example, via optical fabric 412, sled 404A-1 in rack 402A may possess signaling connectivity with sled 404A-2 in rack 402A, as well as the six other sleds 404B-1, 404B-2, 404C-1, 404C-2, 404D-1, and 404D-2 that are distributed among the other racks 402B, 402C, and 402D of data center 400. The embodiments are not limited to this example.

Figure 5:
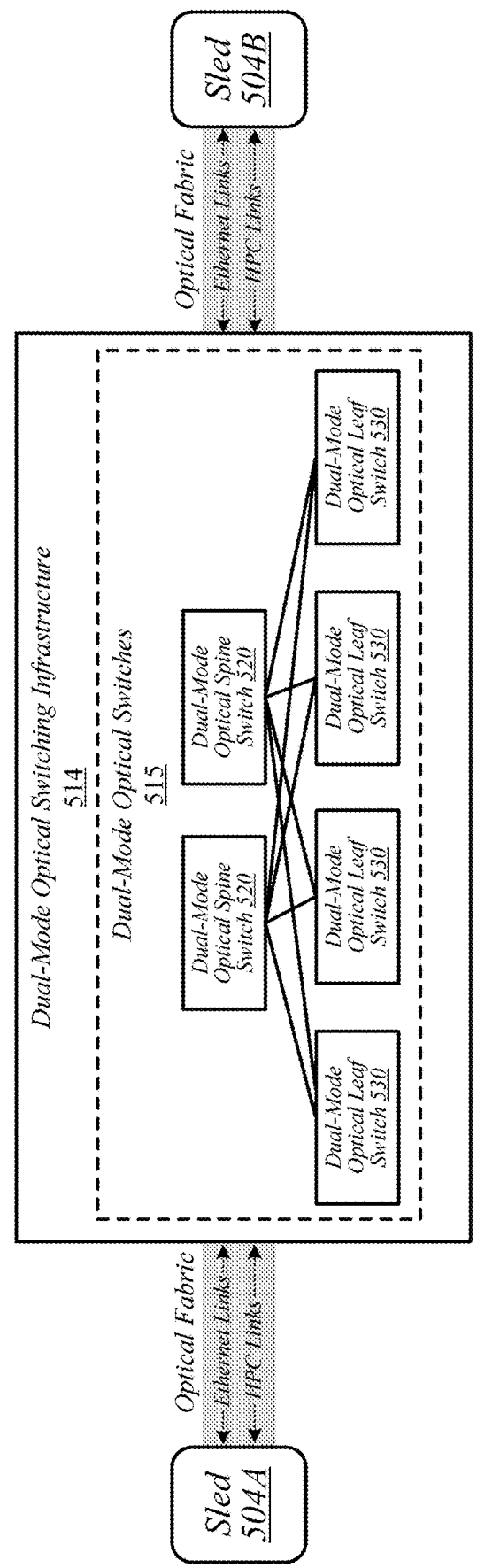
FIG. 5 illustrates an example of a switching infrastructure.

FIG. 5 illustrates an overview of a connectivity scheme 500 that may generally be representative of link-layer connectivity that may be established in some embodiments among the various sleds of a data center, such as any of example data centers 100, 300, and 400 of FIGS. 1, 3, and 4. Connectivity scheme 500 may be implemented using an optical fabric that features a dual-mode optical switching infrastructure 514. Dual-mode optical switching infrastructure 514 may generally comprise a switching infrastructure that is capable of receiving communications according to multiple link-layer protocols via a same unified set of optical signaling media, and properly switching such communications. In various embodiments, dual-mode optical switching infrastructure 514 may be implemented using one or more dual-mode optical switches 515. In various embodiments, dual-mode optical switches 515 may generally comprise high-radix switches. In some embodiments, dual-mode optical switches 515 may comprise multi-ply switches, such as four-ply switches. In various embodiments, dual-mode optical switches 515 may feature integrated silicon photonics that enable them to switch communications with significantly reduced latency in comparison to conventional switching devices. In embodiments, the dual-mode switch may be a single physical network wire that may be capable of carrying Ethernet or Onmi-Path communication, which may be auto-detected by the dual-mode optical switch 515 or configured by the Pod management controller. This allows for the same network to be used for Cloud traffic (Ethernet) or High Performance Computing (HPC), typically Onmi-Path or Infiniband. Moreover, and in some instances, an Onmi-Path protocol may carry Onmi-Path communication and Ethernet communication. In some embodiments, dual-mode optical switches 515 may constitute leaf switches 530 in a leaf-spine architecture additionally including one or more dual-mode optical spine switches 520. Note that in some embodiments, the architecture may not be a leaf-spine architecture, but may be a two-ply switch architecture to connect directly to the sleds.

In various embodiments, dual-mode optical switches may be capable of receiving both Ethernet protocol communications carrying Internet Protocol (IP packets) and communications according to a second, high-performance computing (HPC) link-layer protocol (e.g., Intel's Omni-Path Architecture's, Infiniband) via optical signaling media of an optical fabric. As reflected in FIG. 5, with respect to any particular pair of sleds 504A and 504B possessing optical signaling connectivity to the optical fabric, connectivity scheme 500 may thus provide support for link-layer connectivity via both Ethernet links and HPC links. Thus, both Ethernet and HPC communications can be supported by a single high-bandwidth, low-latency switch fabric. The embodiments are not limited to this example.

Figure 6:
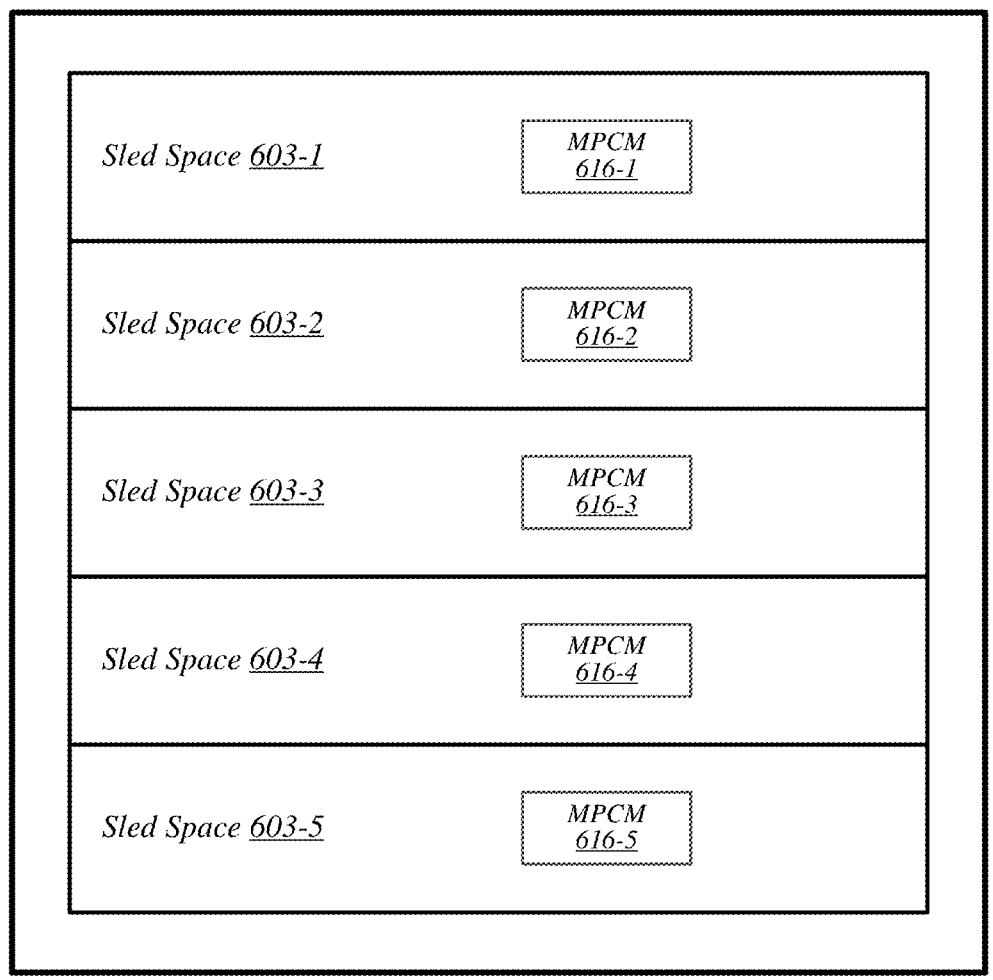
FIG. 6 illustrates and example of a data center.

FIG. 6 illustrates a general overview of a rack architecture 600 that may be representative of an architecture of any particular one of the racks depicted in FIGS. 1 to 4 according to some embodiments. As reflected in FIG. 6, rack architecture 600 may generally feature a plurality of sled spaces into which sleds may be inserted, each of which may be robotically-accessible via a rack access region 601. In the particular non-limiting example depicted in FIG. 6, rack architecture 600 features five sled spaces 603-1 to 603-5. Sled spaces 603-1 to 603-5 feature respective multi-purpose connector modules (MPCMs) 616-1 to 616-5. In some instances, when a sled is inserted into any given one of sled spaces 603-1 to 603-5, the corresponding MPCM may couple with a counterpart MPCM of the inserted sled. This coupling may provide the inserted sled with connectivity to both signaling infrastructure and power infrastructure of the rack in which it is housed.

Figure 7:
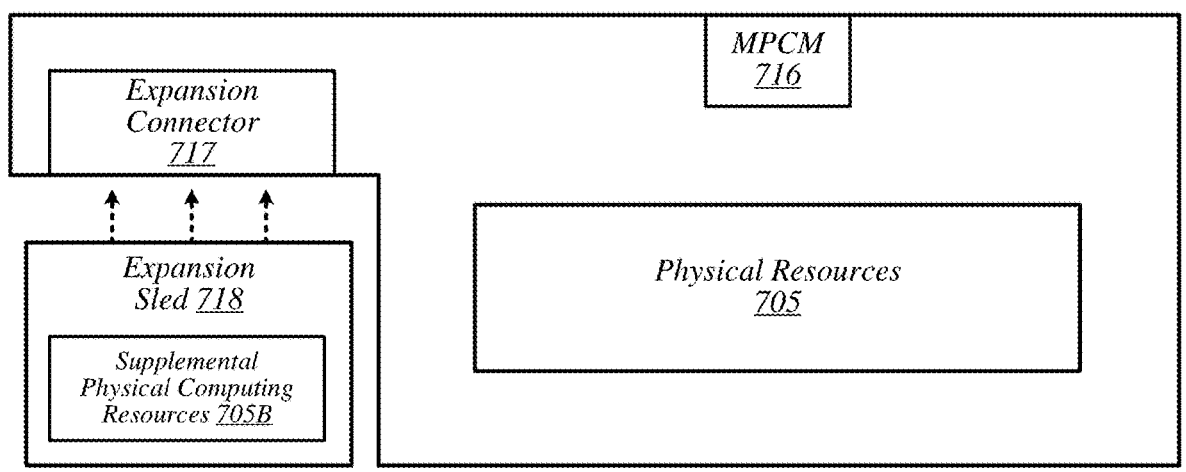
FIG. 7 illustrates an example of a sled.

Included among the types of sleds to be accommodated by rack architecture 600 may be one or more types of sleds that feature expansion capabilities. FIG. 7 illustrates an example of a sled 704 that may be representative of a sled of such a type. As shown in FIG. 7, sled 704 may comprise a set of physical resources 705, as well as an MPCM 716 designed to couple with a counterpart MPCM when sled 704 is inserted into a sled space such as any of sled spaces 603-1 to 603-5 of FIG. 6. Sled 704 may also feature an expansion connector 717. Expansion connector 717 may generally comprise a socket, slot, or other type of connection element that is capable of accepting one or more types of expansion modules, such as an expansion sled 718. By coupling with a counterpart connector on expansion sled 718, expansion connector 717 may provide physical resources 705 with access to supplemental computing resources 705B residing on expansion sled 718. The embodiments are not limited in this context.

Figure 8:
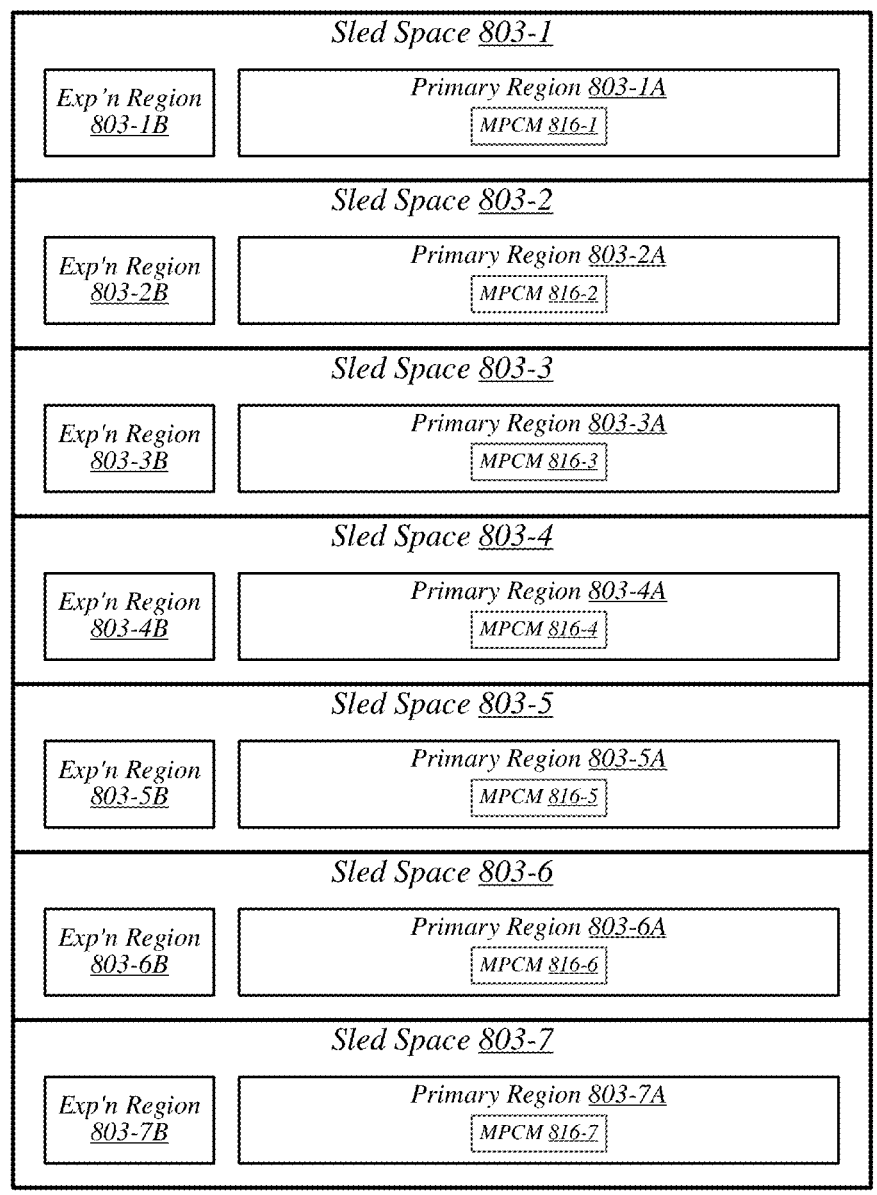
FIG. 8 illustrates an example of a data center.

FIG. 8 illustrates an example of a rack architecture 800 that may be representative of a rack architecture that may be implemented in order to provide support for sleds featuring expansion capabilities, such as sled 704 of FIG. 7. In the particular non-limiting example depicted in FIG. 8, rack architecture 800 includes seven sled spaces 803-1 to 803-7, which feature respective MPCMs 816-1 to 816-7. Sled spaces 803-1 to 803-7 include respective primary regions 803-1A to 803-7A and respective expansion regions 803-1B to 803-7B. With respect to each such sled space, when the corresponding MPCM is coupled with a counterpart MPCM of an inserted sled, the primary region may generally constitute a region of the sled space that physically accommodates the inserted sled. The expansion region may generally constitute a region of the sled space that can physically accommodate an expansion module, such as expansion sled 718 of FIG. 7, in the event that the inserted sled is configured with such a module.

Figure 9:
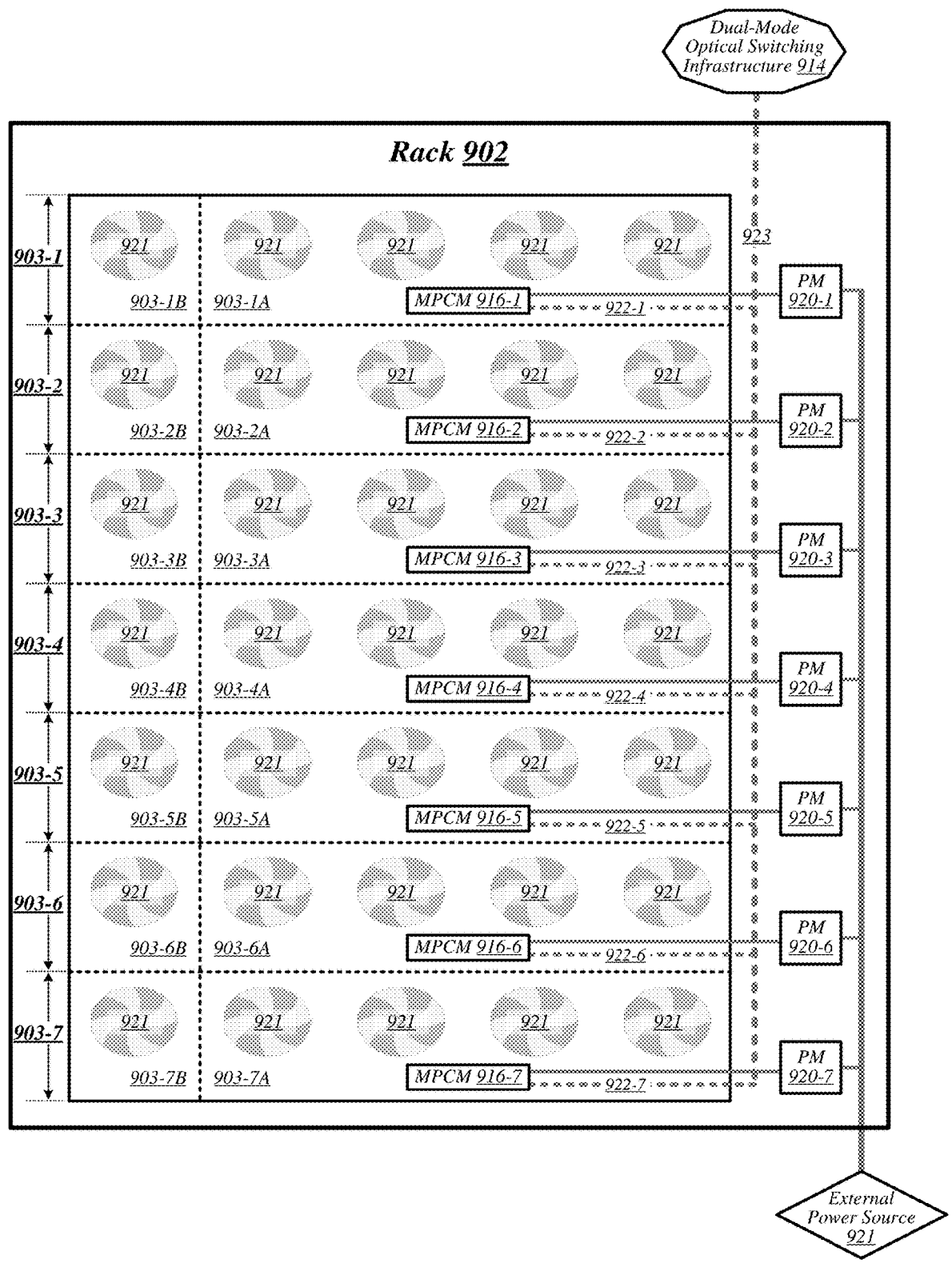
FIG. 9 illustrates an example of a data center.

FIG. 9 illustrates an example of a rack 902 that may be representative of a rack implemented according to rack architecture 800 of FIG. 8 according to some embodiments. In the particular non-limiting example depicted in FIG. 9, rack 902 features seven sled spaces 903-1 to 903-7, which include respective primary regions 903-1A to 903-7A and respective expansion regions 903-1B to 903-7B. In various embodiments, temperature control in rack 902 may be implemented using an air cooling system. For example, as reflected in FIG. 9, rack 902 may feature a plurality of fans 919 that are generally arranged to provide air cooling within the various sled spaces 903-1 to 903-7. In some embodiments, the height of the sled space is greater than the conventional "1 U" server height. In such embodiments, fans 919 may generally comprise relatively slow, large diameter cooling fans as compared to fans used in conventional rack configurations. Running larger diameter cooling fans at lower speeds may increase fan lifetime relative to smaller diameter cooling fans running at higher speeds while still providing the same amount of cooling. The sleds are physically shallower than conventional rack dimensions. Further, components are arranged on each sled to reduce thermal shadowing (i.e., not arranged serially in the direction of air flow). As a result, the wider, shallower sleds allow for an increase in device performance because the devices can be operated at a higher thermal envelope (e.g., 250 W)

due to improved cooling (i.e., no thermal shadowing, more space between devices, more room for larger heat sinks, etc.).

MPCMs 916-1 to 916-7 may be configured to provide inserted sleds with access to power sourced by respective power modules 920-1 to 920-7, each of which may draw power from an external power source 921. In various embodiments, external power source 921 may deliver alternating current (AC) power to rack 902, and power modules 920-1 to 920-7 may be configured to convert such AC power to direct current (DC) power to be sourced to inserted sleds. In some embodiments, for example, power modules 920-1 to 920-7 may be configured to convert 277-volt AC power into 12-volt DC power for provision to inserted sleds via respective MPCMs 916-1 to 916-7. The embodiments are not limited to this example.

MPCMs 916-1 to 916-7 may also be arranged to provide inserted sleds with optical signaling connectivity to a dual-mode optical switching infrastructure 914, which may be the same as—or similar to—dual-mode optical switching infrastructure 514 of FIG. 5. In various embodiments, optical connectors contained in MPCMs 916-1 to 916-7 may be designed to couple with counterpart optical connectors contained in MPCMs of inserted sleds to provide such sleds with optical signaling connectivity to dual-mode optical switching infrastructure 914 via respective lengths of optical cabling 922-1 to 922-7. In some embodiments, each such length of optical cabling may extend from its corresponding MPCM to an optical interconnect loom 923 that is external to the sled spaces of rack 902. In various embodiments, optical interconnect loom 923 may be arranged to pass through a support post or other type of load-bearing element of rack 902. The embodiments are not limited in this context. Because inserted sleds connect to an optical switching infrastructure via MPCMs, the resources typically spent in manually configuring the rack cabling to accommodate a newly inserted sled can be saved.

Figure 10:
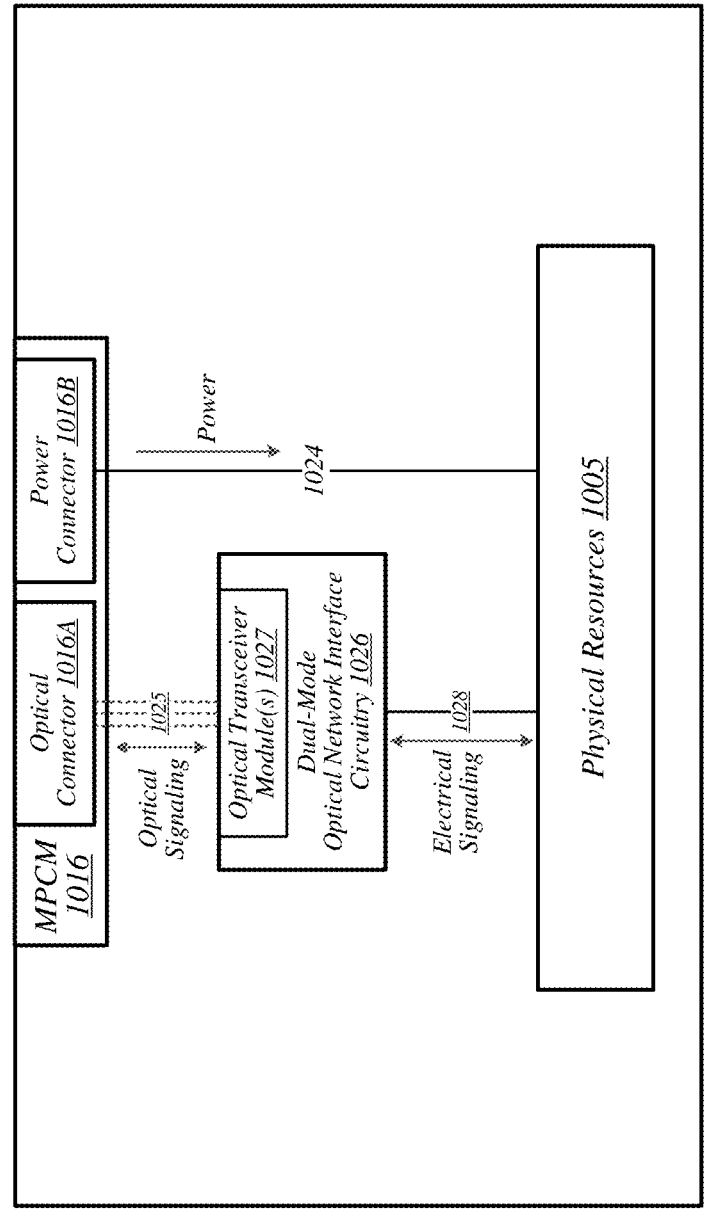
FIG. 10 illustrates an example of a sled.

FIG. 10 illustrates an example of a sled 1004 that may be representative of a sled designed for use in conjunction with rack 902 of FIG. 9 according to some embodiments. Sled 1004 may feature an MPCM 1016 that comprises an optical connector 1016A and a power connector 1016B, and that is designed to couple with a counterpart MPCM of a sled space in conjunction with insertion of MPCM 1016 into that sled space. Coupling MPCM 1016 with such a counterpart MPCM may cause power connector 1016 to couple with a power connector comprised in the counterpart MPCM. This may generally enable physical resources 1005 of sled 1004 to source power from an external source, via power connector 1016 and power transmission media 1024 that conductively couples power connector 1016 to physical resources 1005.

Sled 1004 may also include dual-mode optical network interface circuitry 1026. Dual-mode optical network interface circuitry 1026 may generally comprise circuitry that is capable of communicating over optical signaling media according to each of multiple link-layer protocols supported by dual-mode optical switching infrastructure 914 of FIG. 9. In some embodiments, dual-mode optical network interface circuitry 1026 may be capable both of Ethernet protocol communications and of communications according to a second, high-performance protocol. In various embodiments, dual-mode optical network interface circuitry 1026 may include one or more optical transceiver modules 1027, each of which may be capable of transmitting and receiving optical signals over each of one or more optical channels. The embodiments are not limited in this context.

Coupling MPCM 1016 with a counterpart MPCM of a sled space in a given rack may cause optical connector 1016A to couple with an optical connector comprised in the counterpart MPCM. This may generally establish optical connectivity between optical cabling of the sled and dual-mode optical network interface circuitry 1026, via each of a set of optical channels 1025. Dual-mode optical network interface circuitry 1026 may communicate with the physical resources 1005 of sled 1004 via electrical signaling media 1028. In addition to the dimensions of the sleds and arrangement of components on the sleds to provide improved cooling and enable operation at a relatively higher thermal envelope (e.g., 250 W), as described above with reference to FIG. 9, in some embodiments, a sled may include one or more additional features to facilitate air cooling, such as a heatpipe and/or heat sinks arranged to dissipate heat generated by physical resources 1005. It is worthy of note that although the example sled 1004 depicted in FIG. 10 does not feature an expansion connector, any given sled that features the design elements of sled 1004 may also feature an expansion connector according to some embodiments. The embodiments are not limited in this context.

Figure 11:
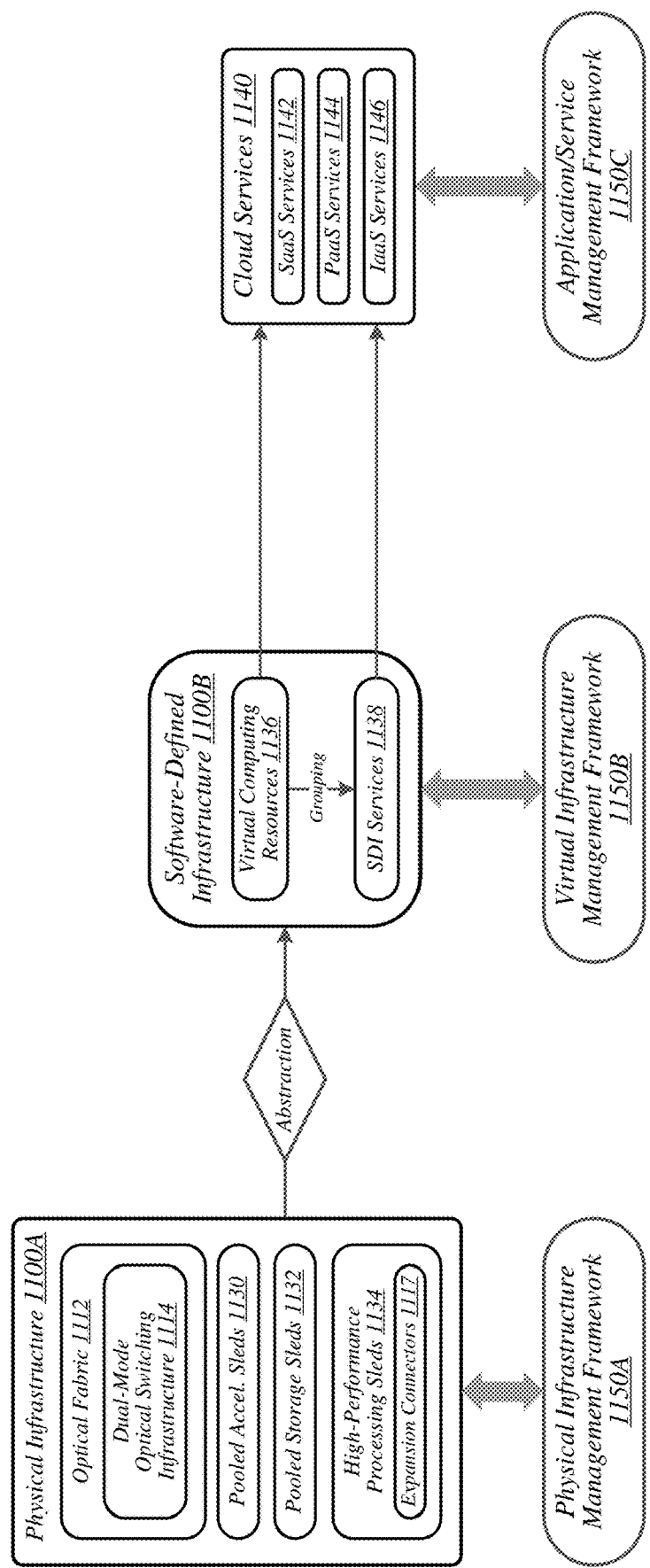
FIG. 11 illustrates an example of a data center.

FIG. 11 illustrates an example of a data center 1100 that may generally be representative of one in/for which one or more techniques described herein may be implemented according to various embodiments. As reflected in FIG. 11, a physical infrastructure management framework 1150A may be implemented to facilitate management of a physical infrastructure 1100A of data center 1100. In various embodiments, one function of physical infrastructure management framework 1150A may be to manage automated maintenance functions within data center 1100, such as the use of robotic maintenance equipment to service computing equipment within physical infrastructure 1100A. In some embodiments, physical infrastructure 1100A may feature an advanced telemetry system that performs telemetry reporting that is sufficiently robust to support remote automated management of physical infrastructure 1100A. In various embodiments, telemetry information provided by such an advanced telemetry system may support features such as failure prediction/prevention capabilities and capacity planning capabilities. In some embodiments, physical infrastructure management framework 1150A may also be configured to manage authentication of physical infrastructure components using hardware attestation techniques. For example, robots may verify the authenticity of components before installation by analyzing information collected from a radio frequency identification (RFID) tag associated with each component to be installed. The embodiments are not limited in this context.

As shown in FIG. 11, the physical infrastructure 1100A of data center 1100 may comprise an optical fabric 1112, which may include a dual-mode optical switching infrastructure 1114. Optical fabric 1112 and dual-mode optical switching infrastructure 1114 may be the same as—or similar to—optical fabric 412 of FIG. 4 and dual-mode optical switching infrastructure 514 of FIG. 5, respectively, and may provide high-bandwidth, low-latency, multi-protocol connectivity among sleds of data center 1100. As discussed above, with reference to FIG. 1, in various embodiments, the availability of such connectivity may make it feasible to disaggregate and dynamically pool resources such as accelerators, memory, and storage. In some embodiments, for example, one or more pooled accelerator sleds 1130 may be included among the physical infrastructure 1100A of data center 1100, each of which may comprise a pool of accelerator resources—such as co-processors and/or FPGAs, for example—that is available globally accessible to other sleds via optical fabric 1112 and dual-mode optical switching infrastructure 1114.

In another example, in various embodiments, one or more pooled storage sleds 1132 may be included among the physical infrastructure 1100A of data center 1100, each of which may comprise a pool of storage resources that is available globally accessible to other sleds via optical fabric 1112 and dual-mode optical switching infrastructure 1114. In some embodiments, such pooled storage sleds 1132 may comprise pools of solid-state storage devices such as solid-state drives (SSDs). In various embodiments, one or more high-performance processing sleds 1134 may be included among the physical infrastructure 1100A of data center 1100. In some embodiments, high-performance processing sleds 1134 may comprise pools of high-performance processors, as well as cooling features that enhance air cooling to yield a higher thermal envelope of up to 250 W or more. In various embodiments, any given high-performance processing sled 1134 may feature an expansion connector 1117 that can accept a far memory expansion sled, such that the far memory that is locally available to that high-performance processing sled 1134 is disaggregated from the processors and near memory comprised on that sled. In some embodiments, such a high-performance processing sled 1134 may be configured with far memory using an expansion sled that comprises low-latency SSD storage. The optical infrastructure allows for compute resources on one sled to utilize remote accelerator/FPGA, memory, and/or SSD resources that are disaggregated on a sled located on the same rack or any other rack in the data center. The remote resources can be located one switch jump away or two-switch jumps away in the spine-leaf network architecture described above with reference to FIG. 5. The embodiments are not limited in this context.

In various embodiments, one or more layers of abstraction may be applied to the physical resources of physical infrastructure 1100A in order to define a virtual infrastructure, such as a software-defined infrastructure 1100B. In some embodiments, virtual computing resources 1136 of software-defined infrastructure 1100B may be allocated to support the provision of cloud services 1140. In various embodiments, particular sets of virtual computing resources 1136 may be grouped for provision to cloud services 1140 in the form of SDI services 1138. Examples of cloud services 1140 may include—without limitation—software as a service (SaaS) services 1142, platform as a service (PaaS) services 1144, and infrastructure as a service (IaaS) services 1146.

In some embodiments, management of software-defined infrastructure 1100B may be conducted using a virtual infrastructure management framework 1150B. In various embodiments, virtual infrastructure management framework 1150B may be designed to implement workload fingerprinting techniques and/or machine-learning techniques in conjunction with managing allocation of virtual computing resources 1136 and/or SDI services 1138 to cloud services 1140. In some embodiments, virtual infrastructure management framework 1150B may use/consult telemetry data in conjunction with performing such resource allocation. In various embodiments, an application/service management framework 1150C may be implemented in order to provide QoS management capabilities for cloud services 1140. The embodiments are not limited in this context.

Figure 12:
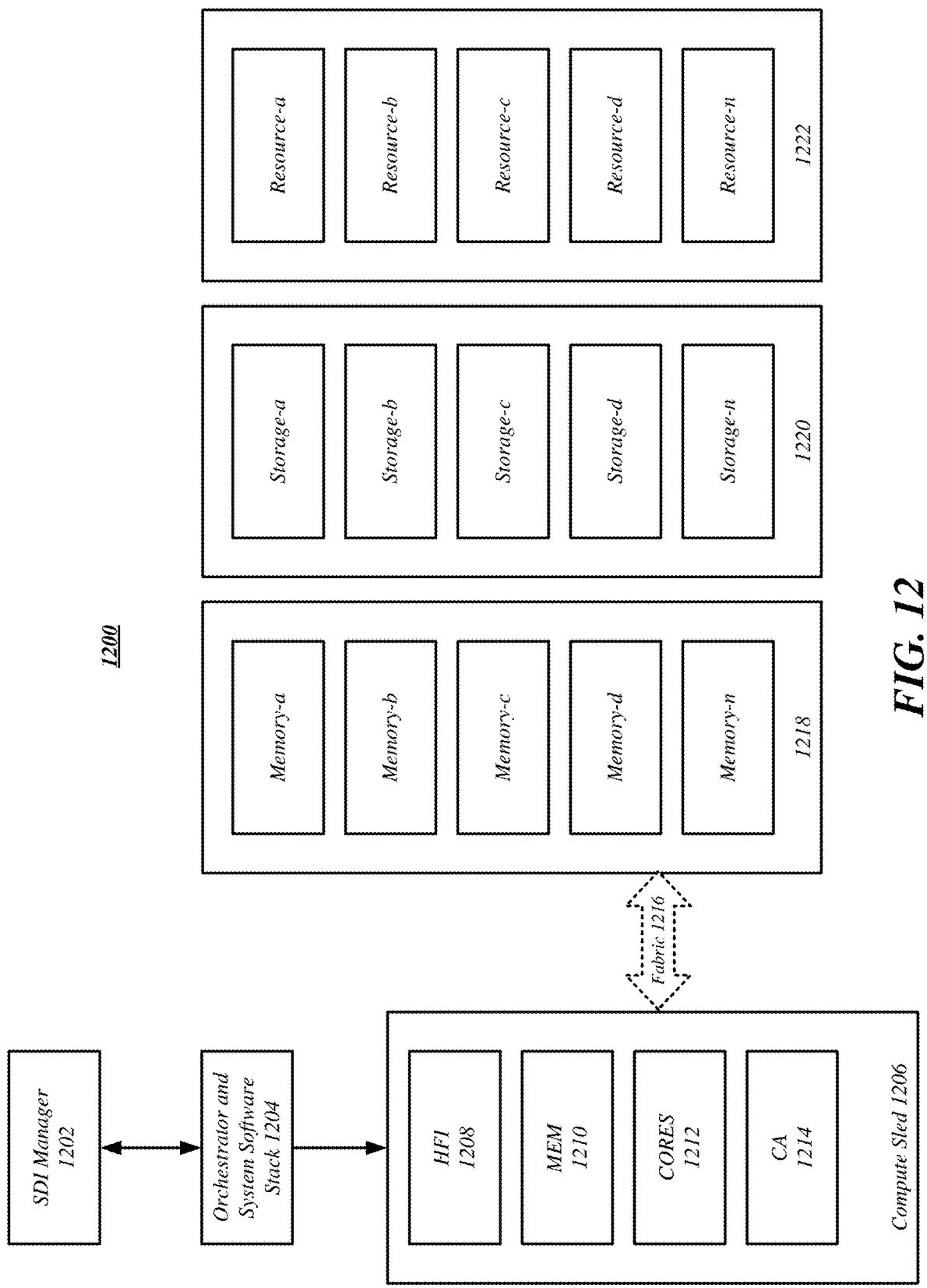
FIG. 12 illustrates a block diagram of a system according to an embodiment.

FIG. 12 illustrates a block diagram of a system according to an embodiment. System 1200 may be a SDI architecture, in which resources may be defined by applications, and composite nodes may be created from a set of available resources on an application-by-application basis. In some data centers, the resource selection and allocation for the application may be done by a resource manager, which may be operated separately from, or within, an orchestrator. Traditional architectures may be composed by a set of static platforms or nodes Ns={N1, . . . , Nm} that the resource manager may allocate to the application based upon characteristics, properties, and/or requirements. Each node may include a set of resources with a certain characteristics (i.e., performance, capacity, etc.). The data center may be composed at the same time by different nodes with different types of resources, for example.

Forthcoming data center architectures may be based on SDI, such as the architecture illustrated in FIG. 12. In SDI architectures, applications may be executed on top of a composite node, which may be dynamically created by the SDI manager 1202 (i.e., a Rack Scale Design Pod Manager, in some exemplary embodiments), or created based upon user or application instructions in some embodiments. A Rack Scale Design may include a hardware architecture that includes the ability to dynamically compose physical hardware resources into the most optimal configuration (e.g., composed or composite node) for each workload using an open application programming interface standard. These composite nodes, which may be composed by different resources that are disaggregated from the platform and distributed in different parts of the data center, may be virtualized to the application and are shown as an isolated and "local" resource. In other words, resources may be physically spread out remotely from a computing platform and connected via a fabric, as described herein.

In general terms, SDI architectures may expose a set of pools of resources, such as memory pool 1218, storage pool 1220, and resource pool 1222, each comprising one or more nodes of a given resource, to the orchestrator 1204 and system software stack 1204. Orchestrator 1204, based on user requests or application requests, may request to SDI manager 1204 to compose a node based on those requirements. The composed node may be defined by SDI manager 1202, as described in detail herein, and returned to orchestrator 1204. Once a composed node is defined by SDI manager 1202 and received by orchestrator 1204, an application may be booted and deployed on the composed node, which may include one or more resources from a compute sled 1206 and one or more resources from memory pool 1218, storage pool 1220, and resource pool 1222, connected via fabric 1216. While three exemplary pools are illustrated, it can be appreciated that more or less pools may be used in various embodiments. Further, resource pool 1222 may include one or more data center resources, such as field-programmable gate arrays (FPGAs), for example. Compute sled 1206 may include one or more components, such as Host Fabric Interconnect/Interface (HFI) node 1208, MEM memory node 1210, CORES processing node 1212, and caching agent (CA) node 1214, which may each be consistent with one or more of the embodiments described herein.

In an embodiment, CA node(s) 1214 may be the coherency agents within a node that process memory requests from the cores within the same node. Home Agents (HA) may be the node clusters that are responsible for processing memory requests from the CAs and may act as a home for part of the memory address space (one die may have multiple homes having a distributed address space mapping). Depending on the address space that requests are targeting, they may go to the same node's local memory, they may go the Unified Path Interconnect (UPI) agent (formerly called QPI or KTI) to route the request to the other processors within the same coherent domain or they may go to processors through the Host Fabric Interface (HFI) that are outside the coherent domain. All the processors connected through UPI may belong to the same coherent domain. One system may be composed by one or more coherent domains being all the coherent domains connected through fabric interconnect. For example high-performance computing systems (HPC) or data centers may be composed by N clusters or servers that can communicate with each other using fabric 1216. Using the fabric 1216, each coherent domain may expose some address regions to the other coherent domains. However, accesses between different coherent domains may not be coherent. Some techniques described herein may assume that a fabric interconnect is used, such as Omni-Path, as described herein, which may allow mapping address of memory ranges between different coherent domains.

Figure 13:
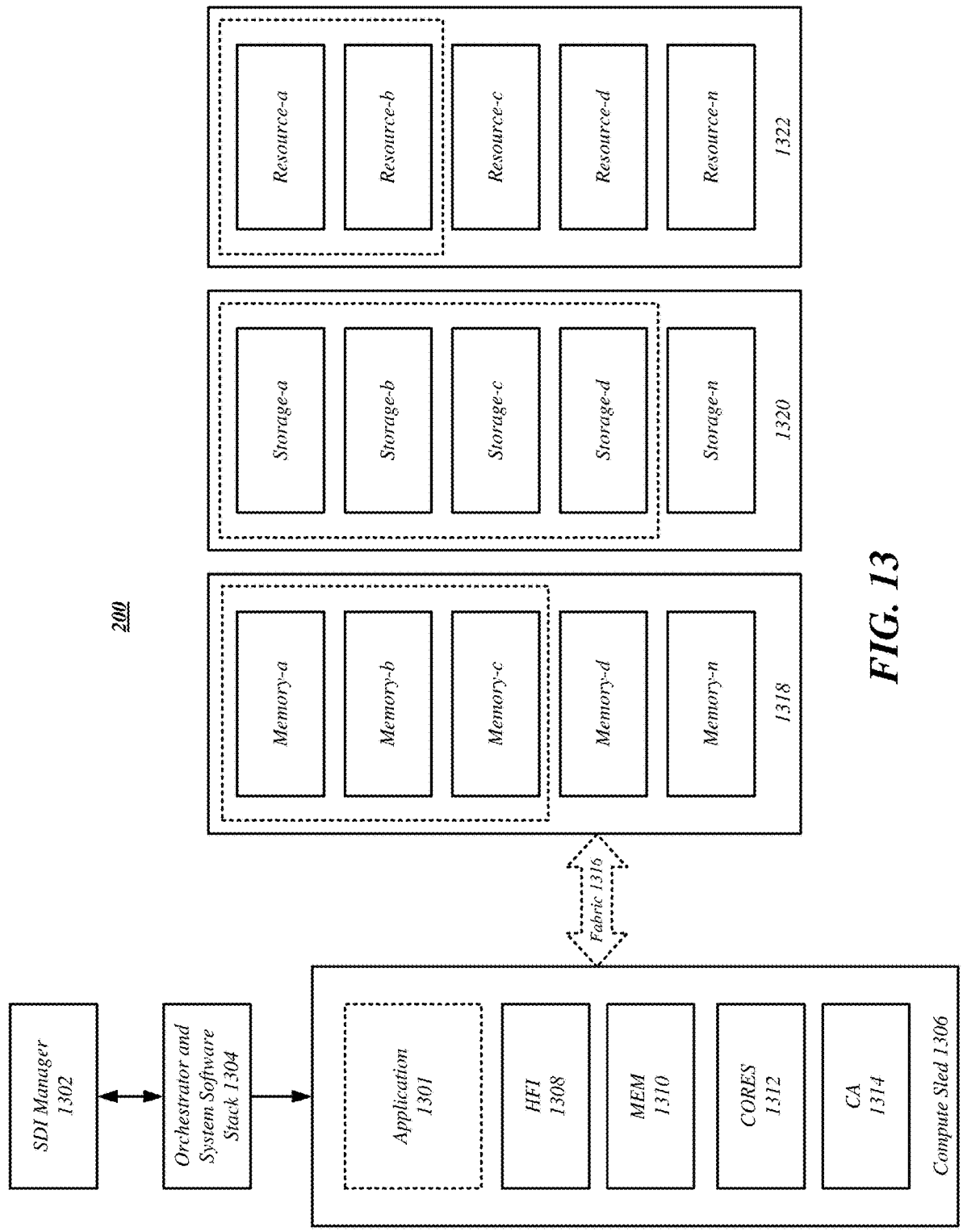
FIG. 13 illustrates a block diagram of a system according to an embodiment.

FIG. 13 illustrates a block diagram of a system according to an embodiment. As illustrated within FIG. 13, an SDI system 1300 (with like-numbered elements with respect to FIG. 12) may include an application 1301 running on compute sled 1306. As illustrated, application 1301 is running on a composed node, which may be defined by SDI manager 1302 to include compute sled 1306, three memory nodes from memory pool 1318, four storage nodes from storage pool 1320, and two resource nodes from resource pool 1322. Once the composite node is created, an OS may be booted in the node and the application may begin execution using the aggregated resources as if they were physically in the same node.

The time required to request and create a composite node may negatively impact system performance and response time. Further, existing data centers may have different architectures in place and adoption of SDI may be hindered by existing practices. To address these potential issues, partitions, or queues, of static or dynamic composite nodes may be created prior to application requests. In this manner, the time to create a node may be reduced, and the practices used by existing data centers may be continued while enjoying the benefits of an SDI architecture.

Figure 14:
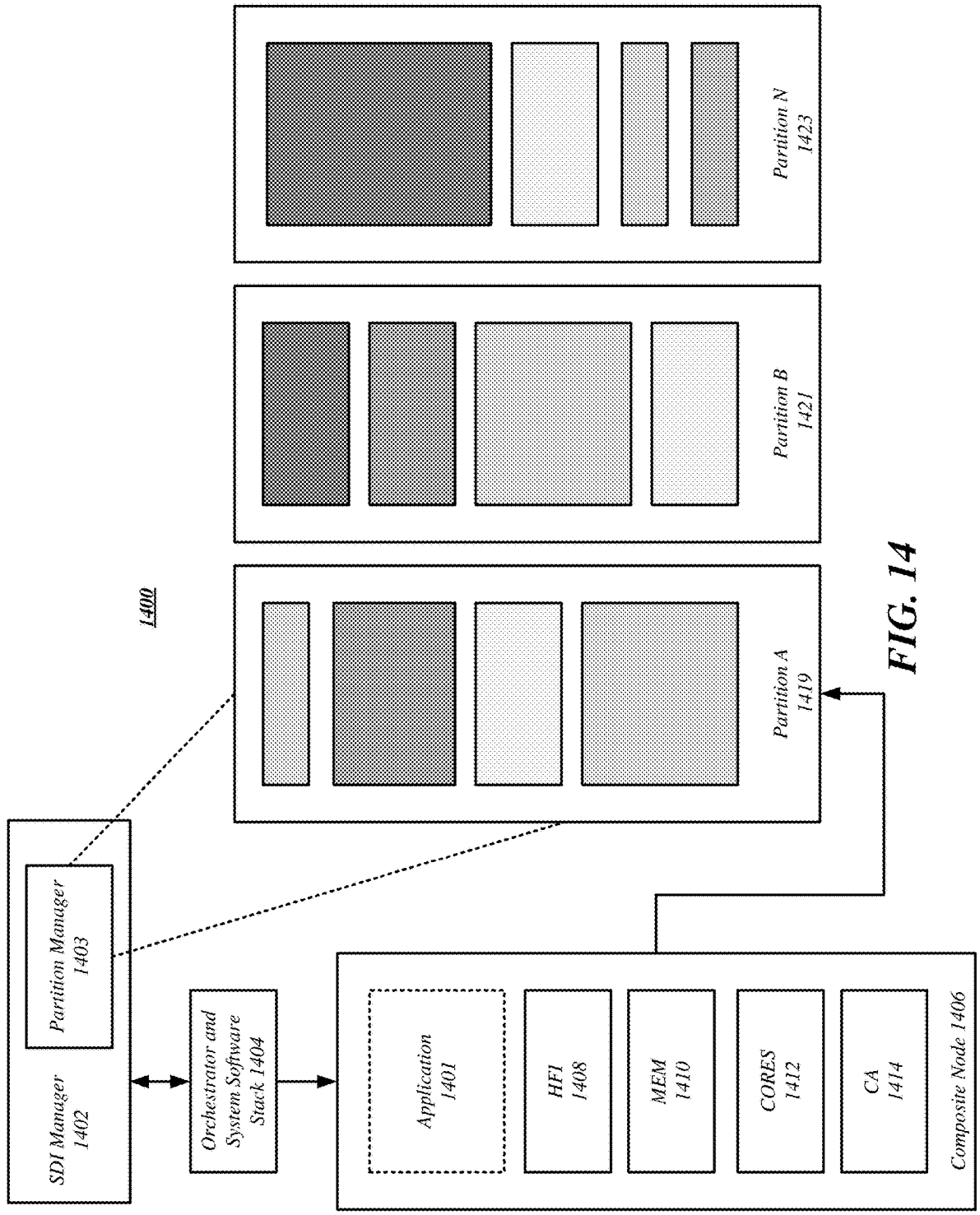
FIG. 14 illustrates a block diagram of a system according to an embodiment.

FIG. 14 illustrates a block diagram of a system according to an embodiment. The concept of creating a node on-demand presents challenges that may be improved using techniques described herein. In one example, the time required to request and create a composite node may negatively impact system performance and response time. Further, existing data centers may have different architectures in place and adoption of SDI may be hindered by existing practices. To address these potential issues, partitions, or queues, of static or dynamic composite nodes may be created prior to application requests. In this manner, the time to create a node may be reduced, and the practices used by existing data centers may be continued while enjoying the benefits of an SDI architecture. System 1400 includes partition manager 1403, which may be a component of SDI manager 1402. Partition manager 1403 may be configured to create one or more static and/or dynamic partitions of composite nodes such that an application, such as application 1401, may immediately have a composed node ready when a request is made.

As illustrated within FIG. 14, partition manager 1403 may prepopulate N partitions of composite nodes. Partitions 1419, 1421, and 1423 are illustrated, however, it can be appreciated that more or less may be used. Each of partitions 1419, 1421, and 1423 may include a different set of resources chosen to match one or more applications that may make future requests of SDI manager for a composed node. For example, each partition may include a set of nodes with certain characteristics (i.e., compute, storage, memory, fabric, etc.). Each partition may be extended dynamically with more nodes, or reduced in size, based upon detected demand New partitions may be registered to the orchestrator 1404 as new resources dynamically or manually (by system administrators) depending on the level of flexibility of the data center. If data center does not allow adding new resources dynamically (even manually), the partitions may be created at boot time according to the characteristics of expected applications (such as traditional HPC partitions).

As discussed further herein, the creation of partitions may be predicated on a variety of factors such as system settings, user-definable settings, periodically performing an analysis of system activity, and real-time analysis of the system. The SDI manager may have several pools of pre-composed nodes with different characteristics that may be exposed to the orchestration layers as traditional nodes. Further, in some embodiments, partition manager 303 may include an element for the creation of dynamic pools using logic, such as machine learning algorithms or FPGAs, that may learn from the requests received by the orchestration layer and dynamically create new types of nodes to satisfy future requests that will be likely target these type of nodes. In some embodiments, pseudo-dynamic partitions may be created on a periodic basis, such as every few hours or days. In other embodiments, dynamic partitions may be created on a near-real-time basis based upon telemetry data representing the activity of a system.

Figure 15:
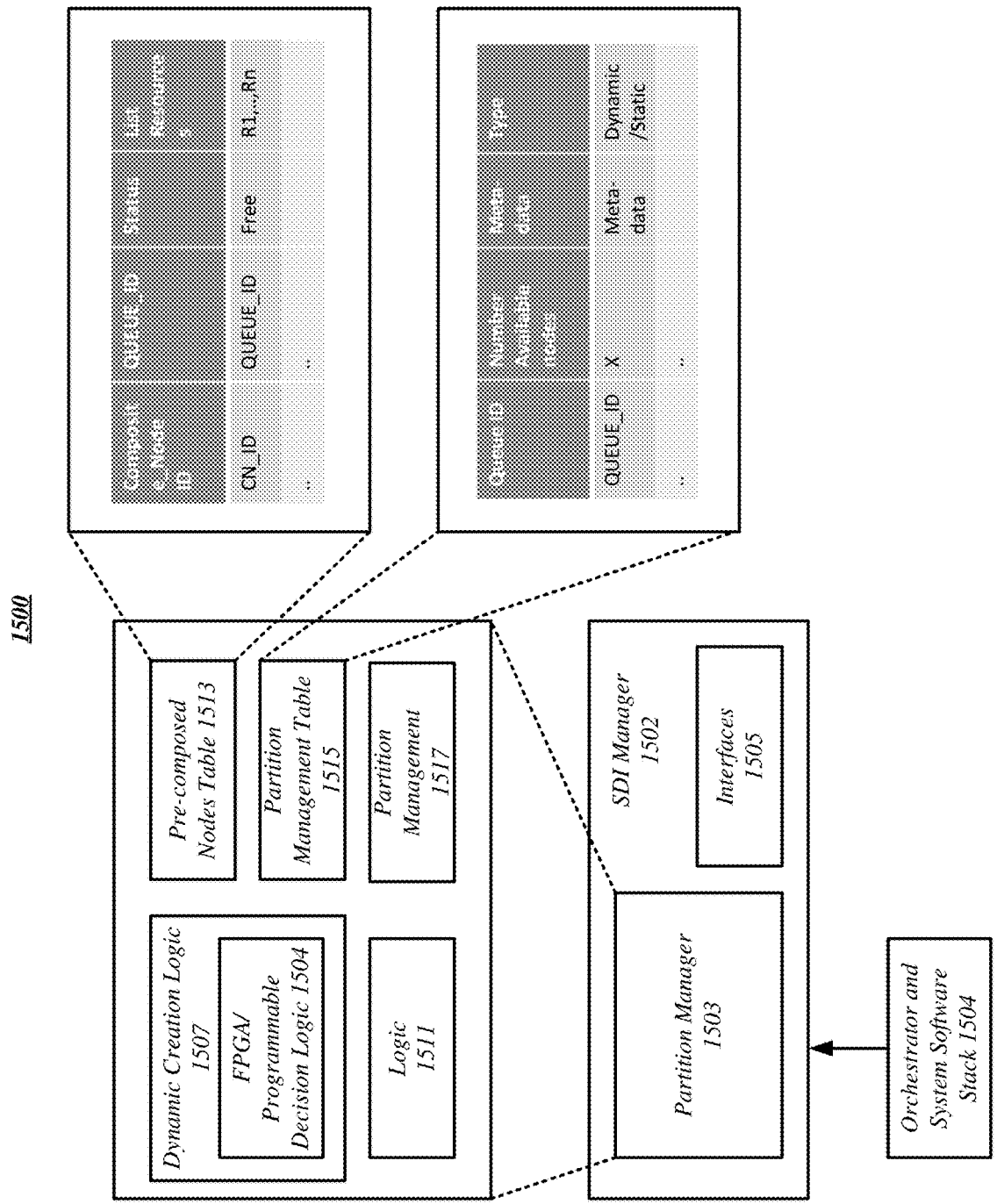
FIG. 15 illustrates a block diagram of a system according to an embodiment.

FIG. 15 illustrates a block diagram of a system according to an embodiment. Specifically, FIG. 15 illustrates a partition manager 1503, which may be a component of an SDI manager 1502. SDI manager 1502 may also include one or more interfaces 1505 to allow for communication between SDI manager 1502 and orchestrator 1504. Orchestrator 1504 may be extended in some embodiments to provide SDI manager 1502 with application requirements from either applications or users. Application requirements may be used by partition manager 1503, as discussed below, to determine node partitions.

Partition manager 1503 may utilize logic 1511 and partition management logic 1517 to create static pre-composed node partitions and dynamic creation logic 1507 to create pseudo-dynamic and dynamic node partitions. Further, dynamic creation logic 1507 may include FPGA/programmable decision logic 1509, which may include one or more FPGA components and/or machine learning modules to use telemetry data and determine pseudo-dynamic and dynamic node partitions. Further, in some embodiments, static node partitions may be dynamically extended as applications require more resources during runtime. In some cases, when a given type of partition has no available composite nodes, partition management logic 1517 may de-compose other nodes to make more availability of the exhausted type of node, or create new nodes of the exhausted type if resources are available.

Partition management logic 1517 may be configured to manage pre-composed nodes table 1513 and partition management table 1515. Pre-composed nodes table 1513 may contain one or more pre-composed nodes that have been created. This table may be used by SDI manager 1502 to register and manage the nodes. Each entry may correspond to a composite node and may have an ID, Queue_ID (sometimes called a Partition_ID), status, and list of disaggregated resources associated with the node, which may identify the type of resource. Other data may include QoS features, for example. A partition management table 1515 may contain one or more different partition types created by the owners of a data center. Each table may contain an ID, current available nodes, the type, and metadata that may have been provided during registration of the partition type by a user. Other day may include currently used nodes, as one example.

Static partitions may be predefined by a user, or by applications running on the system. Once set, static partitions may be created at boot time according to the characteristics input by a user, or based upon expected applications (such as traditional HPC queues). Logic 1511 within partition manager 1503 may handle the creation of static partitions and the registration of static partitions with orchestrator 1504. In some embodiments, dynamic creation logic 1507 may be used to create pseudo-dynamic and/or dynamic partitions. Pseudo-dynamic partitions may be determined based upon telemetry data on a periodic basis. For example, once every hour, day, week, or month, telemetry data may be used to determine which types of pre-composed nodes should be included within a pseudo-dynamic partition. When updated, older pseudo-dynamic partitions may be removed, or simply replaced via attrition, and updated pseudo-dynamic partitions may replace them.

Dynamic creation logic 1507 may also be used to create dynamic partitions, which may update based upon near-real-time analysis of telemetry data using one or more FPGA components and machine learning techniques. In this manner, dynamic partitions may be constantly update to meet the needs of applications running on an SDI system. As dynamic partitions are created, the pre-composed nodes table 1513 may be updated, and the orchestrator 1504 may be made aware so that new nodes are visible. The SDI manager 1502 may be extended with logic that contains an algorithm (implemented on an FPGA or programmable logic 1504) that learns what types of applications (provided requirements) users are submitting to the SDI architecture. The algorithm may be configured to predict what type of applications will be submitted to the SDI architecture and may proactively create new composite nodes and adds them into one or more dynamic partitions. The use of an FPGA solution may allow configuration of different types of algorithms for creating new types of composite nodes based on the data center characteristics (i.e. HPC, Cloud, etc.). In addition, each data center may be able to use their own policies. Similar to the previous partitions, minimum support is needed from the orchestration layer in order to dynamically add or remove nodes, which can be done using hot plug existing mechanisms.

Orchestrator 1504 may be configured in some embodiments to provide information to SDI manager 1502 using one or more interfaces 1505. These interface may include, but are not limited to: 1) Create a pool type, which creates a SDI pool of a given node type (pool may be static or dynamic). The interface may allow orchestrator to provide metadata associated with the characteristics associated with such a pool. The metadata may not be restricted to any specific metrics, however, examples of metrics provided in the metadata may be: compute requirements, storage (e.g., capacity, I/O bandwidth), memory requirements, and FPGA requirements. The requirements may also include QoS requirements that the SDI manager 1502 may use to improve composition for disaggregated resources and compute sleds; 2) Destroy a pool type; 3) Create a number of different composite nodes a given pool type. The SDI manager 1502 may return the list of different composite nodes and the orchestrator or data center will include them in the available nodes in the orchestration algorithms; 4) Disassemble one or a list of pre-composed composite nodes; 5) Access to the list of nodes created to a given dynamic queue, i.e., the dynamic creation logic 1507 may automatically send a callback to the orchestrator 1504 in order to notify that new composite node has been added to a dynamic pool. Then, the orchestrator 1504 may register the new nodes. However, in situations where this registration must be done manually, data center owner may access to the new available nodes and register them manually; 6) Register a new bit-stream kernel in to the dynamic creation logic 1507; 7) Assign a given composite node to a given application. Here is it may be assumed that the orchestrator 1504 requests to the SDI manager 1502 to mark a given composite node as not free. The assumption is that it can provide a unique ID to map the composite to an application.

Figure 16:
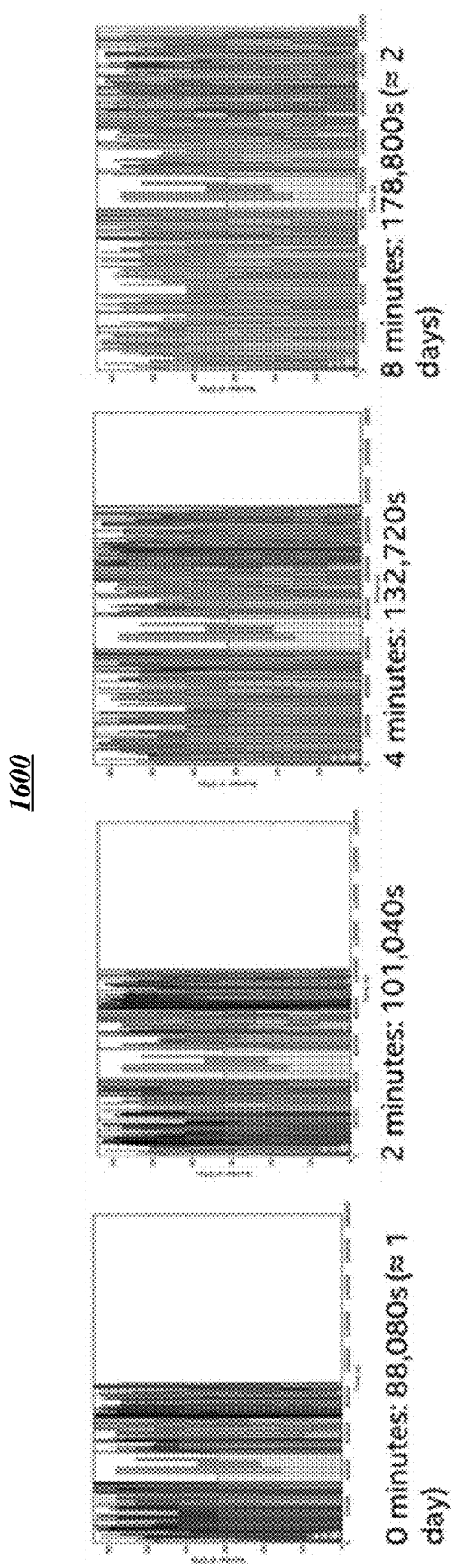
FIG. 16 illustrates an exemplary timing diagram according to an embodiment.

FIG. 16 illustrates an exemplary timing diagram 1600 according to an embodiment. As previously discussed, a challenge with SDI architectures may be the time required to create and boot a node when compared to the runtime of an application. FIG. 16 illustrates the impact of creating on-demand composite nodes using different amounts of time to do the composition and boot process. The system workload (e.g., all applications submitted during one day in the data center) is simulated in a RSD simulator with HPC architecture. The timing diagram 1600 illustrates that when the boot time is eight minutes per composite node, the workload would take two days to complete. This is compared to a completion time of one day using pre-composed nodes using techniques described herein. The data illustrated within FIG. 16 shows that setup and boot time may be critical depending on the system workload. The usage of partitions using techniques described herein may provide a solution or improvement to this problem.

Some of the following figures include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. For example, a logic flow may be implemented by a processor component executing instructions stored on an article of manufacture, such as a storage medium. A storage medium may comprise any non-transitory computer-readable medium or machine-readable medium, such as an optical, magnetic or semiconductor storage. The storage medium may store various types of computer executable instructions, such as instructions to implement one or more disclosed logic flows. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The embodiments are not limited in this context.

FIG. 17 illustrates a logic flow according to an embodiment. Logic flow 1700 may illustrate actions that may be performed by a partition manager of an SDI manager when creating a new static or dynamic partition according to various techniques described herein. At 1702, a partition manager may receive an instruction to create a partition. The partition manager may be part of an SDI manager component, including one or more processor circuits, which may be configured to access one or more resources within an SDI system. In some embodiments, the instruction to create a partition may be received prior to a request from an orchestrator for a composed node to be used for running an application.

As described herein, the instruction to create a partition may be based upon user-defined settings stored within the SDI system. When user instructions are pre-programmed and stored within the SDI manager, one or more partitions may be created at boot time of the SDI system, or of a composed node within the SDI system. Alternatively, or additionally, the instruction to create a partition may dynamically generated based upon based upon detected demand within the SDI system, either during runtime, or at boot time based on perceived demand of one or more applications. When one or more partitions have already been created, the instruction to create a partition may indicate that an existing partition should be extended or released, to satisfy the demands of one or more applications.

As set forth above, partitions may be requested during boot time for an SDI system. Once the SDI system has been booted and is executing, the instruction to create a partition may be received on a periodic basis during execution of the SDI system. In this manner, one or more partitions may be created for use by one or more applications within the system, saving time during the startup and/or execution of the applications.

At 1704, the partition manager may be configured to create the partition, as set forth within the instruction, and at 1706 the partition manager may generate an update to a pre-composed partition table, stored within a non-transitory computer-readable storage medium. In this manner, components of an SDI system, such as the SDI manager and orchestrator, may have access to information about static and/or dynamically created partitions in the one or more remote resources. Thus, applications running on the SDI system may be able to take advantage of these pre-populated partitions, rather than spending time spinning up new partitions. Along these lines, at 1708, the partition manager may generate an update to an orchestrator of the SDI system indicating that the partition has been created.

In some embodiments, the partition manager may include one or more interfaces to communicate between the SDI manager component and the orchestrator. As described herein, the interfaces may provide a communication path between the orchestrator and the SDI manager. These interface may include, but are not limited to: 1) Create a pool type, which creates a SDI pool of a given node type (pool may be static or dynamic). The interface may allow orchestrator to provide metadata associated with the characteristics associated with such a pool. The metadata may not be restricted to any specific metrics, however, examples of metrics provided in the metadata may be: compute requirements, storage (e.g., capacity, I/O bandwidth), memory requirements, and FPGA requirements. The requirements may also include QoS requirements that the SDI manager may use to improve composition for disaggregated resources and compute sleds; 2) Destroy a pool type; 3) Create a number of different composite nodes a given pool type. The SDI manager may return the list of different composite nodes and the orchestrator or data center will include them in the available nodes in the orchestration algorithms; 4) Disassemble one or a list of pre-composed composite nodes; 5) Access to the list of nodes created to a given dynamic queue, i.e., the dynamic creation logic 407 may automatically send a callback to the orchestrator in order to notify that new composite node has been added to a dynamic pool. Then, the orchestrator may register the new nodes. However, in situations where this registration must be done manually, data center owner may access to the new available nodes and register them manually; 6) Register a new bit-stream kernel in to the dynamic creation logic; 7) Assign a given composite node to a given application. Here is it may be assumed that the orchestrator requests to the SDI manager to mark a given composite node as not free.

Figure 18:
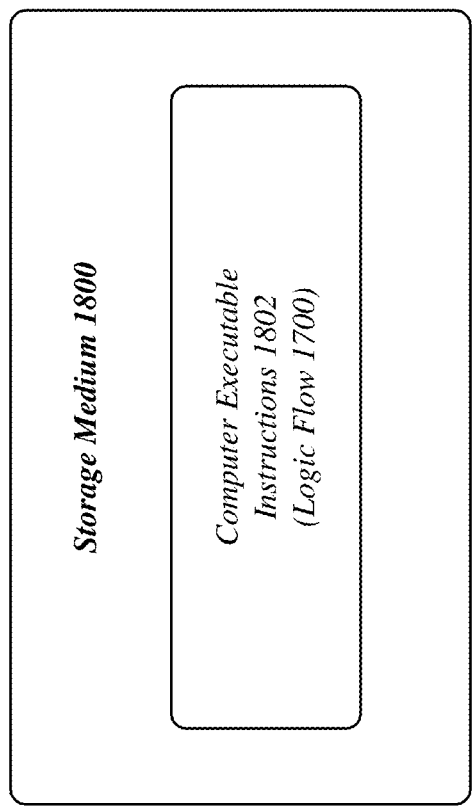
FIG. 18 illustrates an embodiment of computer-readable storage medium.

FIG. 18 illustrates an embodiment of a storage medium 1800. The storage medium 1800 may comprise an article of manufacture. In some examples, the storage medium 1800 may include any non-transitory computer readable medium or machine readable medium, such as an optical, magnetic or semiconductor storage. The storage medium 1800 may store various types of computer executable instructions (e.g., 1802). For example, the storage medium 1800 may store various types of computer executable instructions to implement logic flows described herein using one or more processors and components described herein.

Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

The various elements of the devices described herein may include various hardware elements, software elements, or a combination of both. Examples of hardware elements may include devices, logic devices, components, processors, microprocessors, circuits, processor elements, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the disclosure.

Example 1

A software-defined infrastructure (SDI) system, comprising: an SDI manager component, including one or more processor circuits to access one or more resources, the SDI manager component including a partition manager to: create one or more partitions using the one or more resources, the one or more partitions each including a plurality of nodes of a similar resource type; generate an update to a pre-composed partition table, stored within a non-transitory computer-readable storage medium, including the created one or more partitions; receive a request from an orchestrator for a node; selecting one of the created one or more partitions to the orchestrator based upon the pre-composed partition table; and identifying the selected partition to the orchestrator.

Example 2

The SDI system of Example 1, the partition manager to receive an instruction from the orchestrator to create a partition prior to the orchestrator running an application.

Example 3

The SDI system of Example 1, the one or more partitions are created based upon user-defined settings stored within the SDI system.

Example 4

The SDI system of Example 3, wherein the one or more partitions are created at boot time.

Example 5

The SDI system of Example 1, wherein the one or more partitions are created based upon a dynamically generated instruction from the orchestrator.

Example 6

The SDI system of Example 5, wherein the dynamically generated instruction is based upon detected demand within the SDI system for nodes of a type that are not available in existing partitions.

Example 7

The SDI system of Example 2, wherein the instruction to create a partition indicates that an existing partition should be extended.

Example 8

The SDI system of Example 2, wherein the instruction to create a partition indicates that an existing partition should be reduced in size.

Example 9

The SDI system of Example 1, wherein the orchestrator runs an application on the identified partition.

Example 10

The SDI system of Example 1, wherein the partition manager to:
receive an instruction to create a partition using the one or more remote resources; and
update an orchestrator of the SDI system indicating that the partition has been created.

Example 11

A computer-implemented method, comprising: creating one or more partitions using the one or more resources, the one or more partitions each including a plurality of nodes of a similar resource type; generating an update to a pre-composed partition table, stored within a non-transitory computer-readable storage medium, including the created one or more partitions; receiving a request from an orchestrator for a node; selecting one of the created one or more partitions to the orchestrator based upon the pre-composed partition table; and identifying the selected partition to the orchestrator.

Example 12

The method of Example 11, further comprising receiving an instruction from the orchestrator to create a partition prior to the orchestrator running an application.

Example 13

The method of Example 11, the one or more partitions are created based upon user-defined settings stored within the SDI system.

Example 14

The method of Example 11, wherein the request from the orchestrator for a node identifies a resource type.

Example 15

The method of Example 11, wherein the one or more partitions are created based upon a dynamically generated instruction from the orchestrator.

Example 16

The method of Example 15, wherein the dynamically generated instruction is based upon detected demand within the SDI system for nodes of a type that are not available in existing partitions within the pre-composed partition table.

Example 17

The method of Example 12, wherein the instruction to create a partition indicates that an existing partition should be extended.

Example 18

The method of Example 12, wherein the instruction to create a partition indicates that an existing partition should be reduced in size.

Example 19

The method of Example 11, wherein the orchestrator runs an application on the identified partition.

Example 20

The method of Example 11, the partition manager to further: receive an instruction to create a partition using the one or more remote resources; and communicate to the orchestrator that the partition has been created.

Example 21

A non-transitory computer-readable storage medium that stores instructions for execution by processing circuitry of a software-defined infrastructure (SDI) system, the instructions to cause a SDI manager component of the SDI system to: create one or more partitions using the one or more resources, the one or more partitions each including a plurality of nodes of a similar resource type; generate an update to a pre-composed partition table, stored within a non-transitory computer-readable storage medium, including the created one or more partitions; receive a request from an orchestrator for a node; select one of the created one or more partitions to the orchestrator based upon the pre-composed partition table; and identify the selected partition to the orchestrator.

Example 22

The non-transitory computer-readable storage medium of Example 21, further comprising receiving an instruction from the orchestrator to create a partition prior to the orchestrator running an application.

Example 23

The non-transitory computer-readable storage medium of Example 21, the one or more partitions are created based upon user-defined settings stored within the SDI system.

Example 24

The non-transitory computer-readable storage medium of Example 21, wherein the request from the orchestrator for a node identifies a resource type.

Example 25

The non-transitory computer-readable storage medium of Example 21, wherein the one or more partitions are created based upon a dynamically generated instruction from the orchestrator.

Example 26

The non-transitory computer-readable storage medium of Example 25, wherein the dynamically generated instruction is based upon detected demand within the SDI system for nodes of a type that are not available in existing partitions within the pre-composed partition table.

Example 27

The non-transitory computer-readable storage medium of Example 22, wherein the instruction to create a partition indicates that an existing partition should be extended.

Example 28

The non-transitory computer-readable storage medium of Example 22, wherein the instruction to create a partition indicates that an existing partition should be reduced in size.

Example 29

The non-transitory computer-readable storage medium of Example 21, wherein the orchestrator runs an application on the identified partition.

Example 30

The non-transitory computer-readable storage medium of Example 21, the partition manager to further: receive an instruction to create a partition using the one or more remote resources; and communicate to the orchestrator that the partition has been created.

Example 31

A software-defined infrastructure (SDI) system, comprising: means for creating one or more partitions using the one or more resources, the one or more partitions each including a plurality of nodes of a similar resource type; means for generating an update to a pre-composed partition table, stored within a non-transitory computer-readable storage medium, including the created one or more partitions; means for receiving a request from an orchestrator for a node; means for selecting one of the created one or more partitions to the orchestrator based upon the pre-composed partition table; and means for identifying the selected partition to the orchestrator.

Example 32

The system of Example 31, further comprising means for receiving an instruction from the orchestrator to create a partition prior to the orchestrator running an application.

Example 33

The system of Example 31, the one or more partitions are created based upon user-defined settings stored within the SDI system.

Example 34

The system of Example 31, wherein the request from the orchestrator for a node identifies a resource type.

Example 35

The system of Example 31, wherein the one or more partitions are created based upon a dynamically generated instruction from the orchestrator.

Example 36

The system of Example 35, wherein the dynamically generated instruction is based upon detected demand within the SDI system for nodes of a type that are not available in existing partitions within the pre-composed partition table.

Example 37

The system of Example 32, wherein the instruction to create a partition indicates that an existing partition should be extended.

Example 38

The system of Example 32, wherein the instruction to create a partition indicates that an existing partition should be reduced in size.

Example 39

The method of Example 31, wherein the orchestrator runs an application on the identified partition.

Example 40

The method of Example 31, further comprising: means for receiving an instruction to create a partition using the one or more remote resources; and means for communicate to the orchestrator that the partition has been created.

Example 41

An apparatus, comprising: at least one memory; at least one processor; and logic, at least a portion of the logic comprised in hardware and executed by the at least one processor, the logic to: create one or more partitions using the one or more resources, the one or more partitions each including a plurality of nodes of a similar resource type; generate an update to a pre-composed partition table, stored within a non-transitory computer-readable storage medium, including the created one or more partitions; receive a request from an orchestrator for a node; select one of the created one or more partitions to the orchestrator based upon the pre-composed partition table; and identify the selected partition to the orchestrator.

Example 42

The apparatus of Example 41, further comprising receiving an instruction from the orchestrator to create a partition prior to the orchestrator running an application.

Example 43

The apparatus of Example 41, the one or more partitions are created based upon user-defined settings stored within the SDI system.

Example 44

The apparatus of Example 41, wherein the request from the orchestrator for a node identifies a resource type.

Example 45

The apparatus of Example 41, wherein the one or more partitions are created based upon a dynamically generated instruction from the orchestrator.

Example 46

The apparatus of Example 45, wherein the dynamically generated instruction is based upon detected demand within the SDI system for nodes of a type that are not available in existing partitions within the pre-composed partition table.

Example 47

The apparatus of Example 42, wherein the instruction to create a partition indicates that an existing partition should be extended.

Example 48

The apparatus of Example 42, wherein the instruction to create a partition indicates that an existing partition should be reduced in size.

Example 49

The apparatus of Example 41, wherein the orchestrator runs an application on the identified partition.

Example 50

The apparatus of Example 41, the partition manager to further: receive an instruction to create a partition using the one or more remote resources; and communicate to the orchestrator that the partition has been created.

The invention claimed is:
1. A software-defined infrastructure (SDI) system, comprising:
an SDI manager component, including one or more processor circuits to access one or more resources, the SDI manager component including a partition manager to:

create a plurality of partitions using the one or more resources, each partition comprising a respective composite node, of a plurality of composite nodes;

update a pre-composed nodes table, stored within a non-transitory computer-readable storage medium, to reflect the creation of the plurality of partitions;

receive a request from an orchestrator for a node to execute an application;

selecting a first composite node of the plurality of composite nodes from the pre-composed nodes table; and identify, to the orchestrator, the first composite node to execute the application.

2. The SDI system of claim 1, the partition manager to receive an instruction from the orchestrator to create the plurality of partitions prior to receiving the request from the orchestrator.

3. The SDI system of claim 1, the plurality of partitions are created based upon user-defined settings stored within the SDI system.

4. The SDI system of claim 3, wherein the plurality of partitions are created at boot time.

5. The SDI system of claim 1, wherein the plurality of partitions are created based upon a dynamically generated instruction from the orchestrator, wherein each of the plurality of composite nodes are composed of a respective set of computing resources from a plurality of physical host systems.

6. The SDI system of claim 5, wherein the dynamically generated instruction is based upon detected demand within the SDI system for a first type of composite node and a determination that the first type of composite node is not available to execute the application in existing partitions specified in the pre-composed nodes table.

7. The SDI system of claim 2, wherein the instruction to create the plurality of partitions indicates that an existing partition should be extended.

8. The SDI system of claim 2, wherein the instruction to create the plurality of partitions indicates that an existing partition should be reduced in size.

9. The SDI system of claim 1, wherein the orchestrator runs the application on the first composite node.

10. The SDI system of claim 1, wherein the partition manager is further to:

receive an instruction to create a new partition using the one or more resources;

responsive to the received instruction to create the new partition, select a first partition of the plurality of partitions corresponding to the first composite node without creating additional partitions; and update an orchestrator of the SDI system indicating that the partition has been created.

11. A computer-implemented method, comprising:

creating a plurality of partitions using one or more resources in a software-defined infrastructure (SDI) system, each partition comprising a respective composite node, of a plurality of composite nodes;

updating a pre-composed nodes table, stored within a non-transitory computer-readable storage medium, to reflect the creation of the plurality of partitions;

receiving a request from an orchestrator for a node to execute an application;

selecting a first composite node of the plurality of composite nodes from the pre-composed nodes table; and identifying, to the orchestrator, the first composite node to execute the application.

12. The method of claim 11, further comprising receiving an instruction from the orchestrator to create the plurality of partitions prior to receiving the request from the orchestrator.

13. The method of claim 11, the plurality of partitions are created based upon user-defined settings stored within the SDI system.

14. The method of claim 11, wherein the request from the orchestrator for the node identifies a resource type.

15. The method of claim 11, wherein the plurality of partitions are created based upon a dynamically generated instruction from the orchestrator, wherein each of the plurality of composite nodes are composed of a respective set of computing resources from a plurality of physical host systems.

16. The method of claim 15, wherein the dynamically generated instruction is based upon detected demand within the SDI system for a first type of composite node and a determination that the first type of composite node is not available to execute the application in existing partitions specified in the pre-composed nodes table.

17. The method of claim 12, wherein the instruction to create the plurality of partitions indicates that an existing partition should be extended.

18. The method of claim 12, wherein the instruction to create the plurality of partitions indicates that an existing partition should be reduced in size.

19. The method of claim 11, wherein the orchestrator runs the application on the first composite node.

20. The method of claim 11, to further comprising:

receiving an instruction to create a new partition;

responsive to the received instruction to create the new partition, selecting a first partition of the plurality of partitions corresponding to the first composite node without creating additional partitions or additional nodes; and communicating to the orchestrator that the first partition has been created.

21. A non-transitory computer-readable storage medium that stores instructions for execution by processing circuitry of a software-defined infrastructure (SDI) system, the instructions to cause a SDI manager component of the SDI system to:

create a plurality of partitions using one or more resources, each partition comprising a respective composite node, of a plurality of composite nodes;

update a pre-composed nodes table, stored within a non-transitory computer-readable storage medium, to reflect the creation of the plurality of partitions;

receive a request from an orchestrator for a node to execute an application;

select a first composite node of the plurality of composite nodes based on the pre-composed nodes table; and identify to the orchestrator, the first composite node to execute the application.

22. The non-transitory computer-readable storage medium of claim 21, further comprising receiving an instruction from the orchestrator to create the plurality of partitions prior to receiving the request from the orchestrator.

23. The non-transitory computer-readable storage medium of claim 21, wherein the plurality of partitions are created based upon user-defined settings stored within the SDI system.

24. A software-defined infrastructure (SDI) system, comprising:

means for creating a plurality of partitions using one or more resources in the SDI system, each partition comprising a respective composite node, of a plurality of composite nodes;

means for updating a pre-composed partition table, stored within a non-transitory computer-readable storage medium, to reflect the creation of the plurality of partitions;

means for receiving a request from an orchestrator for a node to execute an application;

means for selecting a first partition of the plurality of partitions based on the pre-composed partition table; and means for identifying, to the orchestrator, the first partition to execute the application.

25. The system of claim 24, further comprising means for receiving an instruction from the orchestrator to create the plurality of partitions prior to receiving the request from the orchestrator.

* * * * *